United States Patent
Gojkovic et al.

(10) Patent No.: US 10,301,582 B2
(45) Date of Patent: May 28, 2019

(54) FLAVOUR STABLE BEVERAGES

(71) Applicant: Carlsberg Breweries A/S, Copenhagen V (DK)

(72) Inventors: Zoran Gojkovic, Holte (DK); Pia Vaag, Lyngby (DK); Arvid Garde, Hillerød (DK)

(73) Assignee: CARLSBERG BREWERIES A/S, Copenhagen V (DK)

( * ) Notice: Subject to any disclaimer, the term of this patent is extended or adjusted under 35 U.S.C. 154(b) by 27 days.

(21) Appl. No.: 15/108,216

(22) PCT Filed: Dec. 23, 2014

(86) PCT No.: PCT/DK2014/050448
§ 371 (c)(1),
(2) Date: Jun. 24, 2016

(87) PCT Pub. No.: WO2015/101377
PCT Pub. Date: Jul. 9, 2015

(65) Prior Publication Data
US 2016/0340626 A1    Nov. 24, 2016

(30) Foreign Application Priority Data

Jan. 2, 2014 (DK) .................. 2014 70001

(51) Int. Cl.
| | | |
|---|---|---|
| *C12H 1/22* | (2006.01) | |
| *C12H 1/00* | (2006.01) | |
| *C12H 1/07* | (2006.01) | |
| *C12C 7/28* | (2006.01) | |
| *C12C 5/00* | (2006.01) | |
| *A23L 2/74* | (2006.01) | |
| *A23L 2/84* | (2006.01) | |

(52) U.S. Cl.
CPC .............. *C12C 5/004* (2013.01); *A23L 2/74* (2013.01); *A23L 2/84* (2013.01); *C12C 5/00* (2013.01); *C12C 7/28* (2013.01); *C12H 1/003* (2013.01); *C12H 1/063* (2013.01); *C12H 1/22* (2013.01); *A23V 2002/00* (2013.01)

(58) Field of Classification Search
CPC ... C12C 5/004; C12C 7/28; A23L 2/74; A23L 2/84; C12H 1/003; C12H 1/063; C12H 1/22

USPC .......................................................... 426/18
See application file for complete search history.

(56) References Cited

U.S. PATENT DOCUMENTS

| | | | |
|---|---|---|---|
| 3,285,607 A | 8/1966 | Kilburn et al. | |
| 2010/0260889 A1* | 10/2010 | Elvig | C12C 5/004 |
| | | | 426/12 |
| 2011/0215000 A1* | 9/2011 | Garde | B01D 61/422 |
| | | | 205/701 |
| 2011/0318454 A1* | 12/2011 | Obrecht | A23L 2/38 |
| | | | 426/46 |

FOREIGN PATENT DOCUMENTS

| | | |
|---|---|---|
| EP | 0 049 497 | 4/1982 |
| EP | 0066270 A2 | 12/1982 |
| EP | 0 924 294 | 6/1999 |
| EP | 1 557 459 | 7/2005 |
| WO | WO 2010/025933 | 3/2010 |
| WO | WO 2010/025935 | 3/2010 |
| WO | WO 2011/003887 | 1/2011 |

OTHER PUBLICATIONS

Baert, J. J. 2012. J. Agric. Food. Chem. 60:11449-11472 (Year: 2012).*
EP—1995-000685—Machine Translation (Year: 1995).*
Toennies, G. et al. J. Biol. Chem. 1941. 140: 131 (Year: 1941).*
Ma Li, ISBN 978-7-5019-6072-9, dated Sep. 2007, and English translation.
Nie et al., "Influence of malting conditions on the amino acid composition of malt," China Brewing 223(10): 89-92, (2010), and English Translation.
Office Action from Chinese Patent Application 201480076727.6 dated Feb. 2, 2019.

* cited by examiner

*Primary Examiner* — Hamid R Badr
(74) *Attorney, Agent, or Firm* — McNeill Baur PLLC

(57) ABSTRACT

The invention relates to methods for producing flavor stable beverages. The methods involve reducing the level of one or more amino acids, and in particular the level of methionine. The level of amino acids may be reduced by a number of different methods, for example by increasing the level of acid or base and removal of said acid or base by Reverse Electro-Enhanced Dialysis. The level of amino acids may also be reduced by treatment with an oxidizing agent, such as $H_2O_2$. The invention also comprises combinations of such methods.

22 Claims, 7 Drawing Sheets
Specification includes a Sequence Listing.

FLAVOUR STABLE BEVERAGES

FIELD OF INVENTION

The present invention relates to methods for producing flavour stable beverages. The methods of the invention comprise a step of reducing the amount of amino acids in the beverages, which results in beverages with much reduced generation of aged flavour. The invention also presents useful methods for reducing the content of amino acids in a beverage without negatively influencing the flavour of the beverage.

BACKGROUND OF INVENTION

The flavor profile of beer is subject to change during storage. Strecker aldehydes have been considered important constituents of aged flavor in beer. It has been proposed that Strecker aldehydes at least partly are formed from amino acids by transamination taking place between an amino acid and an α-dicarbonyl. In particular, it has been proposed that the amino acids listed in Table 1 may be involved in formation of Strecker aldehydes.

TABLE 1

| Strecker amino acid | pI of amino acid | Strecker aldehyde | Taste threshold of aldehyde (ppb) |
|---|---|---|---|
| Valine | 5.96 | 2-methyl propanal | 1000 |
| Isoleucine | 6.02 | 2-methyl butanal | 1500 |
| Leucine | 5.98 | 3-methyl butanal | 600 |
| Methionine | 5.74 | Methional | 250 |
| Phenyl alanine | 5.48 | Phenyl acetaldehyde | 1600 |

The flavour threshold for these aldehydes have been determined by Meilgaard, 1975, in Flavor chemistry in beer: Part II: Flavor and flavor threshold of 239 aroma volatiles, Tech. Q.—Master Brew. Assoc. Am., 12: 151-168 and are indicated in Table 1. Spiking beer with amino acids appears to result in increased levels of Strecker aldehydes. Thus Vesely et al., 2003 (Proceedings of the 29th European Brewery Convention Congress—(2003), 94/1-94/11) found increased levels of various Strecker aldehydes after spiking beer with amino acids.

However, the contribution of amino acids under normal conditions to the formation of aged flavor in beer has been disputed. Thus, one study found that 85% of the Strecker aldehydes present in aged beer are derived from Strecker degradation during wort production, while only 15% were derived from Strecker degradation in the bottled beer (Suda et al., Proceedings of the 31$^{st}$ European Brewery Convention Congress (2007), suda1/1-suda1/7). Thus the amino acid level in fresh beer appears to have little impact on the formation of Strecker aldehydes during beer aging.

Also it has been found that aldehydes formed during beer production are bound to other compounds, and said bound aldehydes may be released over time during storage (Baert et al., 2012, J. Agric. Food Chem., 60: 11449-11472). Thus attempts to reduce Strecker aldehydes in beer have been aimed at reducing formation and/or content of the aldehydes during production of beer. Baert et al., 2012 (vide supra) thus describes numerous practical measures to reduce aldehyde staling in beer including for example use of a yeast strain with high aldehyde reducing activity.

SUMMARY OF INVENTION

Accordingly, there is a need for methods for preparing beer and other cereal based beverages, wherein the generation of aged flavour is reduced significantly in said beer during storage. The present inventors have found that by lowering the levels of amino acids in wort, then the generation of aged flavour is reduced significantly in the resulting beverages during storage.

In contrast, previous strategies for reducing Strecker aldehydes have usually been directed at reducing the level of the aldehydes themselves during beer production. Thus, Baert et al., 2012 (vide supra) describes numerous methods for reducing aldehyde staling in beer, but not a single of these are directed to reducing the amount of amino acids in wort or during fermentation.

However, the present invention provides methods for preparing beverages from a cereal extract with a high or medium level of amino acids, wherein the methods comprises a step of reducing the level of Strecker amino acids leading to a beverage which does not or to a much lower degree develop aged flavour during storage.

The present invention also provides numerous novel methods for reducing the level of amino acids in the cereal extract.

Thus, it is an aspect of the present invention to provide methods for producing a flavour stable cereal based beverage, said method comprising the steps of:
i) providing a cereal extract comprising at least 25 mg/L methionine;
ii) treating said cereal extract to reduce the content of one or more amino acid selected from the group consisting of methionine, phenylalanine, valine, leucine and isoleucine, thereby obtaining a treated cereal extract;
iii) processing said treated cereal extract into a beverage, wherein said beverage has a total content of the amino acids methionine, phenylalanine, valine, leucine and isoleucine of at the most 100 mg/L and/or a content of methionine less than 5 mg/L.

It is also an aspect of the invention to provide methods for reducing the content of at least one amino acid in a cereal extract, said method comprising the steps of
a) increasing the level of an acid and/or a base in the cereal extract; and
b) removing at least part of the acidic anion of said increased acid and/or of the basic cation of said increased base through a Reverse Electro-Enhanced Dialysis membrane stack.

It is also an aspect of the invention to provide methods for producing a flavour stable cereal based beverage, said method comprising the steps of
i) providing a cereal extract;
ii) treating said cereal extract to reduce the content of at least one amino acids by performing the method comprising steps a) and b) described above, thereby obtaining a treated cereal extract;
iii) processing said treated cereal extract into a beverage It is furthermore an aspect of the invention to provide methods for reducing the content of methionine in a cereal extract, said method comprising the step of incubating said cereal extract with an oxidising agent.

It is also an aspect of the invention to provide methods for reducing the content of methionine in a cereal extract, said method comprising incubating said cereal extract with an enzyme or a mixture of enzymes capable of catalysing formation of $H_2O_2$.

It is also an aspect of the invention to provide methods for producing a cereal based beverage, said method comprising the steps of:
i) providing a cereal extract comprising methionine;
ii) treating said cereal extract to reduce the content of methionine as described, thereby obtaining a treated cereal extract;
iii) processing said treated cereal extract into a beverage.

DETAILED DESCRIPTION OF THE INVENTION

Method of Producing a Beverage

Figure 1:
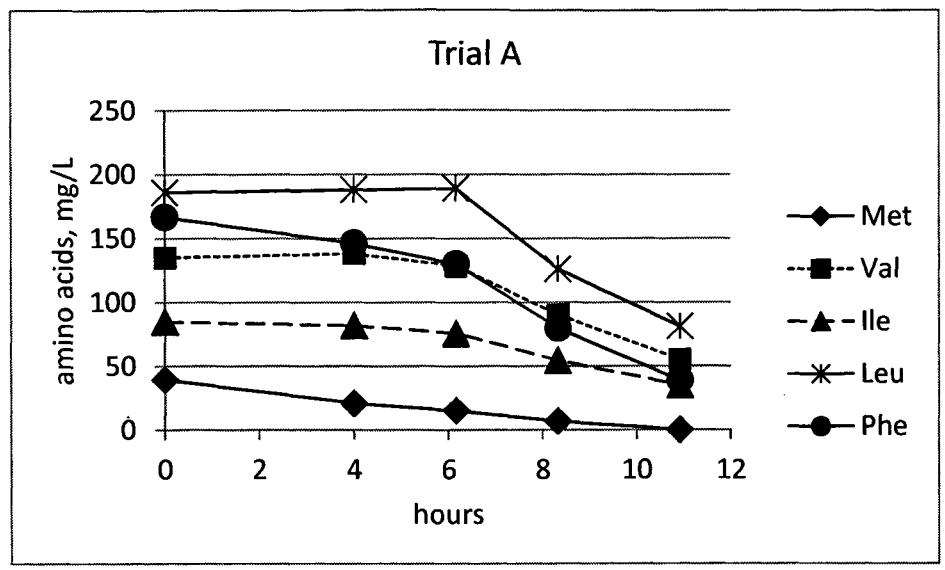
FIG. 1 shows the contents of methionine (Met), valine (Val), isoleucine (Ile), leucine (Leu), and phenylalanine (Phe) during a REED assisted enzymatic conversion of glucose to gluconic acid. The trial was carried out at 40° C. and pH 4.2, and terminated after ca. 11 hours.

The present invention relates to methods for preparing a cereal based beverage less prone to the development of aging flavour during storage. Interestingly, the present invention discloses that beverages, which have been subjected to a step of reduction of amino acid content are much less prone to development of aged flavours. The properties of the beverages prepared by the methods of the invention are described in more detail herein below in the section "Property of beverages".

In general, the methods according to the invention comprises the steps of
i) Providing a cereal extract
ii) treating said cereal extract to reduce the content of one or more amino acid selected from the group consisting of methionine, phenylalanine, valine, leucine and isoleucine, thereby obtaining a treated cereal extract
iii) processing said treated cereal extract into a beverage.

Step i) consists of providing a cereal extract, which may be any of the cereal extracts described herein below in the section "Cereal extract". Cereal extracts contain a relatively high level of amino acids, which however can be reduced by simple methods such as dilution with e.g. water or with an aqueous solution with e.g. sugar. Dilution will however have a negative impact on the taste of the resulting beverages and thus is less desirable. The methods of the present invention are most useful for preparing beverages of cereal extracts having a medium to high level of amino acids. It is thus preferred that the cereal extracts comprise at least 25 mg/L methionine. Examples of such cereal extracts are normal malt based wort compositions.

Step ii) consists of treating the cereal extract to reduce the content of one or more amino acids selected from the group consisting of methionine, phenylalanine, valine, leucine and isoleucine. Said treatment may be undertaken by reducing the level of amino acids with the aid of a dialysis as described herein below in the section "Reducing the content of amino acids with dialysis". In particular, the invention discloses that the levels of amino acids may be reduced by increasing the level of at least one acid, while at least partly simultaneously therewith also reducing the level of acidic anions through an Anion Exchange Reverse Electro-Enhanced Dialysis (AX-REED) membrane stack. The levels of amino acids may be reduced by increasing the level of at least one base, while at least partly simultaneously therewith also reducing the level of basic cations through a Cation Exchange Reverse Electro-Enhanced Dialysis (CX-REED) membrane stack. The level of amino acids may also be reduced with the aid of an oxidising agent as described herein below in the section "Reducing the content of amino acids with oxidising agent". Interestingly, the present invention discloses that the level of some Strecker amino acids, and notably methionine, may be significantly reduced by incubation with an oxidising agent, such as $H_2O_2$.

Step iii) consists of processing said treated cereal extract into a beverage. In some embodiments of the invention, then the treated cereal extract may already be a beverage, in which case step iii) may be omitted.

However, in most cases additional steps are required before the treated cereal extract is a beverage. In one embodiment of the invention, the treated cereal extract may be subjected to a conventional fermentation, e.g. a conventional alcohol fermentation. In such cases the beverage may be a beer. This may in particular be the case when step ii) comprises or consists of reducing the content of amino acids by dialysis or reducing the content of amino acids with an oxidising agent.

Frequently, one or more additional compounds may be added to the treated cereal extract. The additional compound may for example be a flavor compound, a preservative or a functional ingredient. In particular, the additional compound may be any of the additional compounds described herein below in the section "Additional compound".

The treated cereal extract may also be mixed with one or more other liquids before obtaining the final beverage. In one embodiment of the invention the treated cereal extract is mixed with another cereal extract, e.g. with wort, such as wort prepared from milled malt, followed by a fermentation of said mixture.

Step iii) may also include a step of carbonizing in order to obtain a sparkling beverage.

Step iii) may be performed in any of the ways described herein below in the section "Processing into a beverage".

Interestingly, the beverages prepared by the methods of the present invention are less prone to development of aged flavours. Accordingly, beverages prepared by the methods according to the invention may be stored for a long time. The methods for preparing a beverage according the invention may therefore also contain a step iv) consisting of storing the beverage. Step iv) may comprise or consist of storing the beverage for at least one week, such as at least 2 weeks, for example at least 1 month, such as for at least 2 months, for example for at least 3 months, such as for at least 6 months, for example for at least 12 months. In particular step iv) may comprise or consist of storing the beverage for at least one week, such as at least 2 weeks, for example at least 1 month, such as for at least 2 months, for example for at least 3 months, such as for at least 6 months, for example for at least 12 months at ambient temperature. Said ambient temperature is preferably a temperature in the range of 15 to 30° C., such as a temperature in the range of 20 to 25° C. In another embodiment step iv) may comprise or consist of storing the beverage for at least 1 month, such as for at least 2 months, for example for at least 3 months, such as for at least 6 months at an elevated temperature. Said elevated temperature is preferably a temperature in the range of 30 to 50° C., such as a temperature in the range of 30 to 40° C. It is to be understood that said storage may be performed for any reason, for example the storage may be performed in order to obtain a specific stored flavour. However the storage step may also be performed for convenience. Thus, for example for logistic reasons said beverage may be stored in a storehouse before distribution to distributors or stores, and/or it may be stored in a shop prior to sale to the end customer and/or it may be stored by the customer prior to consumption.

Cereal Extract

The present invention relates to methods of preparing a beverage comprising a step i) of providing a cereal extract. In addition the invention relates to methods for reducing the content of methionine and/or other Strecker amino acids in a cereal extract. Said cereal extract may be any cereal extract, and in particular any of the cereal extracts described herein in this section.

Since the methods of the invention comprises a step of reducing the content of at least one amino acid, in general the methods are more useful for preparing beverages of a cereal extract comprising a medium to high level of amino acids. Sometimes it may not be advantageous or required to further reduce amino acids in cereal extracts already containing a very low level of amino acids.

Preferably, the cereal extract is a pure cereal extract. A pure cereal extract according to the invention consists of an aqueous extract of cereal and/or cereal malt and optionally hops. More preferably, the cereal extract is a pure cereal extract of cereal malt and optionally hops. However, it is also comprised within the invention that the cereal extract may comprise additional adjuncts. It is also preferred that the cereal extract is a pure cereal extract to which has been added one or more compounds selected from the group consisting of salts, acids, bases and buffers.

In general it is preferred that the cereal extract comprises at least 25 mg/L methionine, such as at least 30 mg/L methionine, for example at least 35 mg/L methionine. It is also preferred that the cereal extract comprises at least 90 mg/L valine, such as at least 100 mg/L valine, for example at least 110 mg/L valine. It is also preferred that the cereal extract comprises at least 50 mg/L isoleucine, such as at least 60 mg/L isoleucine, for example at least 70 mg/L isoleucine. It is also preferred that the cereal extract comprises at least 125 mg/L leucine, such as at least 150 mg/L leucine, for example at least 175 mg/L leucine. It is also preferred that the cereal extract comprises at least 90 mg/L phenylalanine, such as at least 110 mg/L phenylalanine, for example at least 130 mg/phenylalanine.

In general a pure cereal extract of malt will contain above-mentioned levels of amino acids unless it has been diluted. Diluted cereal extract of malt may be less useful for preparing beverages, because even though the level of amino acids will be reduced, also the level of other compounds will be reduced, for example it will contain less sugar and aroma compounds.

In a preferred embodiment of the present invention the cereal extract is wort, and even more preferably said wort contain above mentioned levels of amino acids. In a very preferred embodiment of the invention the cereal extract is malt based wort.

By the term "wort" as used herein is meant an aqueous extract of milled cereal. In particular, wort may be an aqueous extract of milled malt in which case the wort may be referred to as "malt based wort". Wort may also be an aqueous extract of milled un-malted cereal grains and/or an aqueous extract of a mixture of milled un-malted and malted cereal grains.

The term "malt" as used herein refers to the cereal grains, which have been subjected to steeping, allowed to germinate and then dried. Said drying may for example be kiln drying.

Said wort may be prepared from any cereal. Said cereals may for example be selected from the group consisting of barley, wheat, rye, oat, maize, rice, sorghum, millet, triticale, buckwheat, fonio and *quinoa*. More preferably, the cereal is selected from the groups consisting of barley, wheat, rye, oat, maize and rice, more preferably the cereal is barley.

Thus, in a preferred embodiment of the invention the cereal extract is wort prepared from barley malt. Alternatively, said cereal extract may be wort prepared from un-malted barley or from a mixture of malted and un-malted barley.

Wort is in general prepared by mashing milled malt with water followed by an optional sparging step. The term "Mashing" as used herein refers to the incubation of milled malt in water. Mashing is preferably performed at a specific temperature, and in a specific volume of water. Said temperature may be maintained constant, but is typically changed at specified intervals. Mashing is preferably performed at a temperature of in the range of 50 to 80° C., such as in the range of 60 to 78° C.

Mashing can occur in the presence of adjuncts, which is understood to comprise any carbohydrate source other than malt, such as, but not limited to, unmalted barley, barley syrups, or maize, or rice—either as whole kernels or processed products like grits, syrups or starch. It is however preferred that the mashing is done in the absence of adjuncts, and thus that the wort also is free of adjunct.

The term "sparging" as used herein refers to a process of extracting residual sugars and other compounds from spent grains after mashing with hot water. Sparging is typically conducted in a lauter tun, a mash filter, or another apparatus to allow separation of the extracted water from spent grains.

The wort obtained after mashing is generally referred to as "first wort", while the wort obtained after sparging is generally referred to as the "second wort". If not specified, the term wort may be first wort, second wort, or a combination of both.

After sparging the wort may be heated or boiled e.g. in the presence of hops.

The cereal extract may also be "glucose wort". The term "glucose wort" as used herein refers to wort, which has been treated either during preparation of the wort or after preparation of the wort to convert carbohydrates and/or oligosaccharides to glucose. In particular, glucose wort may be wort comprising at least 50 g/L, such as at least 80 g/L, for example at least 100 g/L, such as at least 120 g/L glucose.

Said treatment to convert carbohydrates and/or oligosaccharides to glucose may be performed using any useful method known to the skilled person, for example by any of the methods described in the section "Converting sugar to glucose" of international patent application PCT/DK2013/050215.

Preferably said treatment to convert carbohydrates and/or oligosaccharides to glucose is done with the aid of an enzyme or mixture of enzymes capable of catalysing hydrolysis of carbohydrates and/or oligosaccharides to glucose. The enzyme or mixture of enzymes may in particular comprise
- a) an enzyme capable of catalysing hydrolysis of terminal (1→4)-linked α-D-glucose residues successively from non-reducing ends of an oligosaccharide resulting in release of β-D-glucose, such as an enzyme classified under EC 3.2.1.3, for example a glucan 1,4-α-glucosidase; and/or
- b) an enzyme capable of catalysing endohydrolysis of (1→4)-α-D-glucosidic linkages in polysaccharides containing three or more (1→4)-α-linked D-glucose units, such as an enzyme classified under EC 3.2.1.1, for example an α-amylase and/or
- c) an enzyme capable of catalysing hydrolysis of (1→6)-α-D-glucosidic linkages in pullulan, amylopectin and glycogen, and in the α- and β-limit dextrins of amylopectin and glycogen, such as an enzyme classified under EC 3.2.1.41, for example pullulanase.

In one embodiment the enzyme or mixture of enzymes comprises one or more of the following enzymes:
- a) Glucan 1,4-α-glucosidase of SEQ ID NO: 1 of international patent application PCT/DK2013/050215;
- b) glucan 1,4-α-glucosidases of SEQ ID NO: 2 of international patent application PCT/DK2013/050215;
- c) glucan 1,4-α-glucosidases of SEQ ID NO: 3 of international patent application PCT/DK2013/050215;
- d) α-amylase of SEQ ID NO: 4 of international patent application PCT/DK2013/050215;
- e) α-amylase of SEQ ID NO: 5 of international patent application PCT/DK2013/050215;
- f) α-amylase of SEQ ID NO: 6 of international patent application PCT/DK2013/050215;
- g) pullulanase of SEQ ID NO: 7 of international patent application PCT/DK2013/050215;
- h) pullulanase of SEQ ID NO: 8 of international patent application PCT/DK2013/050215;
- i) pullulanase of SEQ ID NO: 9 of international patent application PCT/DK2013/050215;
- j) a functional homologue of any of the aforementioned sharing at least 70%, such as at least 80%, for example at least 85%, such as at least 90%, for example at least 95% sequence identity therewith.

Treated Cereal Extract

The present invention relates to methods of preparing a beverage comprising a step ii) of treating a cereal extract to reduce the content of one or more Strecker amino acid. In addition the invention relates to methods for reducing the content of methionine and/or Strecker amino acids in a cereal extract. Cereal extract which has been treated to reduce the content of one or more Strecker amino acids is referred to as "treated cereal extract".

Depending on the particular method, then the treated cereal extract may contain more or less amino acids. In embodiments of the invention wherein the cereal extract is the final beverage or where essentially no amino acids are removed in step iii) e.g. because the final beverage may be obtained from the treated cereal extract by few and/or simple processing steps, which do not significantly alter the amino acid content, then it is preferred that the treated cereal extract contains a very low amount of amino acids. Such embodiments may include methods wherein step ii) comprise or consist of reducing the content of amino acids with dialysis, wherein the cereal extract is incubated with a microorganism capable of fermenting glucose to an organic acid and at least part of said organic acid is removed through an Anion Exchange Reverse Electro-Enhanced Dialysis (AX-REED) membrane stack.

Thus, in such embodiments, the treated cereal extract preferably has a total content of the amino acids methionine, phenylalanine, valine, leucine and isoleucine of at the most 100 mg/L, more preferably at the most 50 m/L, even more preferably at the most 25 mg/L, even more preferably at the most 10 mg/L, yet more preferably at the most 5 mg/L.

In particular the treated cereal extract preferably has a content of methionine of at the most 15 mg/L, such as of the most 10 mg/L, for example of at the most 5 mg/L, such as at the most 3 mg/L. In some embodiments of the invention the level of methionine in the treated cereal extract is below detection level by HPLC. The treated cereal extract may also have a content of valine of at the most 15 mg/L, such as of the most 10 mg/L, for example of at the most 5 mg/L. The treated cereal extract may also have a content of isoleucine of at the most 15 mg/L, such as of the most 10 mg/L, for example of at the most 5 mg/L. The treated cereal extract may also have a content of leucine of at the most 15 mg/L, such as of the most 10 mg/L, for example of at the most 5 mg/L. The treated cereal extract may also have a content of phenylalanine of at the most 60 mg/L, such as at the most 40 mg/L, such as of the most 30 mg/L, for example of at the most 20 mg/L. Aforementioned levels of amino acids are in particular preferred in embodiments of the invention where amino acids are reduced by incubating the cereal extract with a microorganism and at least partly simultaneous subjected to REED treatment.

In particular, the invention discloses that the levels of amino acids may be reduced by increasing the level of at least one acid or at least one base, while at least partly simultaneously therewith also reducing the level of said acidic anions through an Anion Exchange Reverse Electro-Enhanced Dialysis (AX-REED) membrane stack or reducing the level of said basic cations through a Cation Exchange Reverse Electro-Enhanced Dialysis (CX-REED) membrane stack, respectively. The level of amino acids may also be reduced with the aid of an oxidising agent as described herein below in the section "Reducing the content of amino acids with oxidising agent. Interestingly, the present invention discloses that the level of some Strecker amino acids, and notably methionine may be significantly reduced by incubation with an oxidising agent, such as $H_2O_2$.

In other embodiments of the invention, then the treated cereal extract preferably has a content of methionine of at the most 15 mg/L, such as of the most 10 mg/L, for example of at the most 5 mg/L, such as at the most 3 mg/L or even a level of methionine below detection level by HPLC. The treated cereal extract may also have a content of valine of at the most 40 mg/L, such as of the most 30 mg/L, for example of at the most 20 mg/L, such as at the most 10 mg/L. The treated cereal extract may also have a content of isoleucine of at the most 40 mg/L, such as of the most 30 mg/L, for example of at the most 20 mg/L, such as at the most 10 mg/L. The treated cereal extract may also have a content of leucine of at the most 40 mg/L, such as of the most 30 mg/L, for example of at the most 20 mg/L, such as at the most 10 mg/L. The treated cereal extract may also have a content of phenylalanine of at the most 40 mg/L, such as of the most 30 mg/L, for example of at the most 20 mg/L. This may in particular be the case in embodiments of the invention, where amino acids are reduced by a step involving increasing the level of at least one acid or one base, while at least partly simultaneously therewith also reducing the level of acidic anions or basic cations through a Reverse Electro-Enhanced Dialysis membrane stack, wherein said acid or base is increased by addition of said acid or base or by the aid of an enzyme.

In other embodiments of the invention, then it may be preferred that the treated cereal extract maintains a low level of Strecker amino acids. This is in particular the case in embodiments of the invention wherein step iii) comprises fermentation of the treated cereal extract with a microorganism.

Such embodiments may include methods wherein step ii) comprises or consist of reducing the content of amino acids with an oxidising agent. Such embodiments may also include methods wherein step ii) comprise or consist of reducing the content of amino acids by a step involving increasing the level of at least one acid or one base, while at least partly simultaneously therewith also reducing the level of acidic anions or basic cations through a Reverse Electro-Enhanced Dialysis membrane stack, wherein said acid or base is increased by addition of said acid or base or by the aid of an enzyme.

In such embodiments, the treated cereal extract may have a total content of the amino acids methionine, phenylalanine, valine, leucine and isoleucine of at the most 300 mg/L, more preferably at the most 250 mg/L. In particular it is preferred that the treated cereal extract has a content of methionine of at the most 15 mg/L, such as of the most 10 mg/L, for example of at the most 5 mg/L, such as at the most 3 mg/L or even a level of methionine below detection level by HPLC.

Amino Acids

The term "amino acid" as used herein refers to organic compounds composed of amine (—$NH_2$) and carboxylic acid (—COOH) functional groups, along with a side-chain specific to each amino acid. 3-letter and 1-letter codes for standard amino acid are used according to the IUPAC definition.

The term "Strecker amino acid" is used to cover the group of amino acids consisting of valine, isoleucine, leucine, methionine and phenyl alanine.

The methods of the invention in general contain a step of reducing the content of amino acids. In particular, it is important that the content of Strecker amino acids is reduced. Thus the step of reducing the content amino acids, is preferably a step of reducing the content of Strecker amino acids. In some embodiments only the content of one Strecker amino acid is reduced. Thus the step of reducing the content of amino acids may comprise or consist of reducing the content of one or more amino acid selected from the group consisting of methionine, phenylalanine, valine, leucine and isoleucine, such as reducing the content of at least two amino acids selected from the group consisting of methionine, phenylalanine, valine, leucine and isoleucine, such as reducing the content of at least 3 amino acids selected from the group consisting of methionine, phenylalanine, valine, leucine and isoleucine, such as reducing the content of at least 4 amino acid selected from the group consisting of methionine, phenylalanine, valine, leucine and isoleucine, such as reducing the content of each of the amino acids methionine, phenylalanine, valine, leucine and isoleucine. In particular, the methods of the invention may comprise a step of reducing the content of methionine in the cereal extract. Thus step ii) of the methods may comprise or consists of reducing the level of methionine in the cereal extract.

Reducing the Content of Amino Acids with Dialysis

The methods of the invention comprise a step of reducing the content of one or more amino acids selected from the group consisting of methionine, phenylalanine, valine, leucine and isoleucine. In one embodiment this may be achieved with the aid of dialysis.

The present inventors have found that simple dialysis may not be sufficient in order to reduce the content of Strecker amino acids without also significantly reducing the level of sugar. In fact even electrodialysis may not be sufficient ion order to specifically reduce the content of Strecker amino acids. However, step ii) may comprise or consist of reducing the content of one or more Strecker amino acids by a method involving:

a) increasing the level of an acid or a base in the cereal extract; and
b) removing at least part of the acidic anion of said increased acid or at least part of the basic cation of said increased base through a Reverse Electro-Enhanced Dialysis (REED) membrane stack.

Removing said acidic anion or said basic cation through a REED membrane stack may be performed in any of the manners described herein below in the section "REED".

In order to maintain and/or control pH the method may also involve adding either base (if step a) involves increasing the level of acid) or adding acid (if step a) involves increasing the level of base).

When step a) involves increasing the level of an acid, then step b) preferably involve removing at least part of said increased acidic anion through an Anion Exchange Reverse Electro-Enhanced Dialysis (AX-REED) membrane stack.

Removing said acidic anion through an AX-REED membrane stack may be performed in any of the manners described herein below in the section "REED".

When step a) involves increasing the level of a base, then step b) preferably involve removing at least part of said increased basic cation through a cation Exchange Reverse Electro-Enhanced Dialysis (CX-REED) membrane stack.

Removing said basic cation through a CX-REED membrane stack may be performed in any of the manners described herein below in the section "REED".

Steps a) and b) may be performed simultaneously, partly simultaneously or sequentially. Preferably steps a) and b) are performed partly simultaneously, resulting in a method where either A. Acid is continuously added or generated while at the same time being continuously removed through the AX-REED membrane stack; or B. Base is continuously added or generated while at the same time being continuously removed through the CX-REED membrane stack.

Frequently, the level of acid or base is increased for a while before removal of acidic anions or basic cations through the REED membrane stack is being initiated.

The acid may be any acid, in particular any acid containing an acidic anion, which is not toxic or otherwise undesirable. Non limiting examples of useful acids include HCl, phosphoric acid and organic acid. Preferably the acid is an organic acid. As used herein the term "organic acid" refers to any carboxylic acid. Preferably, the organic acid according to the invention is $C_{1-3}$-alkyl or $C_{1-3}$-alkenyl, wherein said $C_{1-3}$-alkyl and $C_{1-3}$-alkenyl is substituted with n-COOH groups, m-OH group and q=0 groups, wherein n is an integer in the range of 1 to 3, m is an integer in the range of 0 to 2 and q is an integer in the range of 0 to 1.

Preferably the organic acid may be propyl substituted with
 1) 1 to 3 —COOH groups, such as with 3 —COOH groups; and
 2) 0 to 1 —OH groups, such as with 1 —OH group
or
the organic acid may be ethyl substituted with
 1) 1 to 2 —COOH groups; and
 2) 0 to 2 —OH groups.

Preferably the term "organic acid" as used herein refers to an acid selected from the group consisting of lactic acid, citric acid, malic acid, tartaric acid, acetic acid, succinic acid, isocitric acid, α-ketoglutaric acid, fumaric acid and oxaloacetic acid.

In one very preferred embodiment of the invention the term "organic acid" as used herein refers to lactic acid.

The level of an acid may be increased using various different methods. Thus, for example the level may be increased simply by addition of acid. Said acid is preferably added over time, e.g. at a rate not exceeding the capacity to extract the corresponding amount of anions through the AX-REED. E.g. the rate may be in the range of 2 to 10 g acid per L per hour. More preferably part of said acid is neutralised by addition of a base before said acid is added at a rate not exceeding the capacity to extract the corresponding amount of anions through the AX-REED.

In another embodiment the level of acid is increased with the aid of an enzyme capable of catalysing formation of an acid. This may be performed in any of the manners described in the section "Increasing level of acid with enzyme" herein below. Useful enzymes are also disclosed in that section.

In another embodiment the level of acid is increased with the aid of a microorganism capable of fermenting a sugar to an organic acid. This may be performed in any of the manners described in the section "Increasing level of acid with microorganism" herein below.

The level of a base may also be increased using various different methods. Thus, for example the level may be increased simply by addition of base. Said base is preferably added over time, e.g. at a rate not exceeding the capacity to extract the corresponding amount of cations through the CX-REED. More preferably part of said base is neutralised by addition of a acid before said base is added at a rate not exceeding the capacity to extract the corresponding amount of anions through the AX-REED.

Increasing Level of Acid with Enzyme

In one embodiment the level of acid is increased with the aid of an enzyme or mixture of enzymes capable of catalysing formation of an acid, preferably an organic acid. In particular, said enzyme or mixture of enzymes may be capable of catalyzing oxidation of sugar to an organic acid. Preferably, said enzyme or mixture of enzymes may be capable of catalyzing oxidation of glucose to an organic acid.

Said enzyme or a mixture of enzymes capable of catalyzing conversion of glucose to form an organic acid may comprise any enzymes, which are capable of catalyzing conversion of glucose to form an organic acid. In one preferred embodiment of the invention the enzyme or a mixture of enzymes capable of catalyzing conversion of glucose to form an organic acid comprises or even consists of a glucose oxidase.

The glucose oxidase to be used with the present invention is in general an enzyme classified under EC 1.1.3.4. Thus the glucose oxidase to be used with the present invention is an oxido-reductase that is capable of catalysing the oxidation of glucose to hydrogen peroxide and D-glucono-δ-lactone. Thus in particular, the glucose oxidase to be used with the present invention is an enzyme capable of catalysing the following reaction:

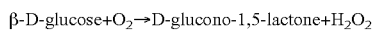

β-D-glucose+$O_2$→D-glucono-1,5-lactone+$H_2O_2$

D-glucono-1,5-lactone hydrolyses in water to gluconic acid. Thus, in an aqueous environment the conversion of glucose catalysed by glucose oxidase lead to the formation of gluconic acid. In the methods of the invention the enzyme or mixture of enzymes capable of catalyzing conversion of glucose to form an organic acid are in general employed in an aqueous environment and thus the enzyme or mixture of enzymes capable of catalyzing conversion of glucose to form an organic acid may comprise or even consist of glucose oxidase.

The glucose oxidase may be any useful glucose oxidase. For example the glucose oxidase may be glucose oxidase of *Aspergillus niger* or *Penicillium amagasakiense*. In one embodiment the glucose oxidase is a glucose oxidase of SEQ ID NO: 1 or a functional homologue thereof sharing at least 70%, such as at least 80%, for example at least 85%, such as at least 90%, for example at least 95% sequence identity therewith. The glucose oxidase may also comprise or even consist of aa 23-605 of SEQ ID NO:1 or a functional homologue of aa 23-605 of SEQ ID NO:1 sharing at least 70%, such as at least 80%, for example at least 85%, such as at least 90%, for example at least 95% sequence identity therewith. The glucose oxidase may also be a glucose oxidase of SEQ ID NO: 2 or a functional homologue thereof sharing at least 70%, such as at least 80%, for example at least 85%, such as at least 90%, for example at least 95% sequence identity therewith.

The glucose oxidase may also be one of commercially available glucose oxidases, such as Hyderase available from Amano Pharmaceutical Co. Ltd., Nagoya, Japan. An advantage of the Hyderase is that is also comprises catalase activity. Thus, Hyderase contains both glucose oxidase and catalase activity.

Furthermore, glucose oxidases described in GB1,373,562, U.S. Pat. No. 4,675,191 and US 20120114791 may be used with the present invention.

As noted above the reaction catalyzed by glucose oxidase also may lead to the formation of $H_2O_2$.

Said enzyme or mixture of enzymes capable of catalyzing oxidation of sugar to an organic acid may be any sugar oxidase. For example it may be a maltose oxidase, which is capable of catalyzing oxidation of maltose to form maltobionic acid. The sugar oxidase may also be a lactose oxidase, which is capable of catalysing conversion of lactose to lactobionic acid.

As disclosed by the present invention $H_2O_2$ may be useful to reduce the level of Strecker amino acids and in particular of methionine. Accordingly, it is preferred that the enzyme or mixture of enzymes capable of catalysing formation of an acid also are capable of catalysing formation of $H_2O_2$. As noted above, one example of an enzyme capable of catalysing both oxidation of a sugar to form an organic acid as well as catalysing formation of $H_2O_2$ is glucose oxidase.

It is noted here that aerating the cereal extract with oxygen is advantageous during conversion of glucose to gluconic acid. The aerating has not been found to be detrimental to the taste of the beverage.

The temperature during enzymatic conversion of the glucose may be selected so that the enzyme used is active at the selected temperature. The temperature may for example be between 10° C. and 70° C., for example between 20° C. and 50° C.

The acid, e.g. the gluconic acid formed by the enzyme catalyzed reaction may continuously be removed through an AX-REED membrane stack. In this way the reaction is not inhibited by accumulation of gluconic acid. This may be done in any of the manners described herein below in the section "REED"

In a preferred embodiment of the method according to the invention oxygen is supplied continuously to the cereal extract incubated with the enzyme or mixture of enzymes containing a glucose oxidase. The supply of oxygen has a remarkably beneficial influence on the reaction rate of the enzymatic reaction. Thus, continuous introduction of oxygen ensures a high reaction rate. The oxygen may be supplied by any suitable means, for example oxygen may be supplied by means of an air pump, a most efficient means for introducing oxygen into the liquid.

The enzyme or mixture of enzymes may in addition to the glucose oxidase also contain additional enzymatic activities. For example the mixture may comprise a catalase. Glucose oxidase and other enzymes catalyzing oxidation of sugar to an organic acid may at the same time catalyze formation of $H_2O_2$. As described herein below short exposure to $H_2O_2$ may be beneficial in order to reduce the level of amino acids and in particular of methionine, however exposure to large amounts of $H_2O_2$ for an extended period of time may be undesirable and cause unwanted oxidation. Thus, in embodiments of the invention wherein an enzyme capable of catalysing formation of an acid and $H_2O_2$ is used, then preferably the methods also comprise incubation with catalase. Said incubation with catalase may be done simultaneously with the incubation with enzyme capable of catalysing formation of acid or is may be done partly overlapping or sequentially. The catalase may be any enzyme capable of catalyzing the decomposition of hydrogen peroxide to water and oxygen. Thus, the catalase may be an enzyme classified under EC 1.11.1.6. In particular the catalase may be an enzyme catalyzing the following reaction:

$$2H_2O_2 \rightarrow O_2 + 2H_2O$$

The catalase may be any useful catalase. For example the catalase may be catalase from *Aspergillus niger, Bacillus subtilis* or *Bos taurus* (in particular, from liver of *Bos taurus*). It is generally preferred that no glucose isomerase is added to any of the liquids during the methods of the invention. Thus it is preferred that no enzyme classified under EC 5.3.1.5 is added to any of the liquid during the methods of the invention.

Functional Homologue

The term "functional homologue" as used herein denotes a polypeptide sharing at least one biological function with a reference polypeptide. In general said functional homologue also shares a significant sequence identity with the reference polypeptide.

Preferably a functional homologue of a reference polypeptide is a polypeptide, which has the same biological function as the reference protein and which shares a high level of sequence identity with the reference polypeptide.

A high level of sequence identity indicates likelihood that the first sequence is derived from the second sequence. Amino acid sequence identity requires identical amino acid sequences between two aligned sequences. Thus, a candidate sequence sharing 80% amino acid identity with a reference sequence, requires that, following alignment, 80% of the amino acids in the candidate sequence are identical to the corresponding amino acids in the reference sequence. Identity according to the present invention is determined by aid of computer analysis, such as, without limitations, the ClustalW computer alignment program (Higgins D., Thompson J., Gibson T., Thompson J. D., Higgins D. G., Gibson T. J., 1994. CLUSTAL W: improving the sensitivity of progressive multiple sequence alignment through sequence weighting, position-specific gap penalties and weight matrix choice. Nucleic Acids Res. 22:4673-4680), and the default parameters suggested therein. The ClustalW software is available from as a ClustalW WWW Service at the European Bioinformatics Institute http://www.ebi.ac.uk/clustalw. Using this program with its default settings, the mature (bioactive) part of a query and a reference polypeptide are aligned. The number of fully conserved residues are counted and divided by the length of the reference polypeptide. Thus, sequence identity is determined over the entire length of the reference polypeptide.

Increasing Level of Acid with Microorganism

In one embodiment the level of acid is increased with the aid of a microorganism capable of fermenting sugar to form an organic acid. In particular, said microorganism may be capable of fermenting glucose to form an organic acid. Such microorganisms are also referred to as "glucose fermenting microorganism" herein. It is preferred that said microorganism is capable of excreting said organic acid into the surrounding culture medium. In another embodiment of the invention the level of base is increased with the aid of a microorganism capable of fermenting sugar to form a base.

Preferably, the glucose fermenting microorganism is a microorganism capable of converting glucose to an organic acid under anaerobic conditions. Said organic acid may be any of the organic acids described herein above in the section "Reducing the content of amino acids with dialysis". In particular, the organic acid may be selected from the group consisting of lactic acid, citric acid, malic acid, tartaric acid, acetic acid, succinic acid, isocitric acid, α-ketoglutaric acid, fumaric acid and oxaloacetic acid. In a preferred embodiment the organic acid is lactic acid.

Accordingly, in a preferred embodiment of the invention glucose fermenting microorganism is capable of fermenting glucose to obtain lactic acid. More preferably the glucose fermenting microorganism is capable of taking up glucose, converting the glucose to lactic acid under anaerobic conditions and excreting at least some of said lactic acid.

The glucose fermenting microorganism to be used with the present invention may preferably be selected from the group consisting of yeast and bacteria. In particular, the glucose fermenting microorganism may be a food grade microorganism, i.e. a microorganism which is acceptable for use in production of food and beverages for human beings.

In one embodiment it is preferred that the glucose fermenting microorganism is a microorganism, which cannot grow to any significant extent in beer, more preferably said microorganism is not capable of growing in beer. In particular, the microorganism may be a bacterium not capable of growing in beer.

It is furthermore preferred that said microorganism is completely devoid of extracellular proteases, i.e. that said microorganism does not express and excrete any protease. In one embodiment the microorganism is yeast. Said yeast may for example be a yeast of the *Kluyveromyces* family, e.g. *K. lactis* or *K. marxianus*. The yeast may also be any of the organic acid producing yeasts described in Loureiro V, Malfeito-Ferreira M: Spoilage yeasts in the wine industry, International Journal of Food Microbiology 2003:86:23-50. For example the yeast may be of the Kloeckera, Dekkera/Brettanomyces or Pichia family.

In one embodiment of the invention the yeast may be selected from the group consisting of yeasts listed in table 1 of international patent application PCT/DK2013/050215.

In one embodiment of the invention the glucose fermenting microorganism is a lactic acid bacterium. The lactic acid bacterium may for example be a bacterium of the order Lactobacillales. In particular the lactic acid bacterium may be a bacterium of a genus selected from the group consisting of *Bifidobacterium, Lactobacillus, Leuconostoc, Pediococcus, Lactococcus, Aerococcus, Carnobacterium, Enterococcus, Oenococcus, Sporolactobacillus, Streptococcus, Tetragenococcus, Vagococcus* and *Weisella*. In particular, the lactic acid bacterium may be a bacterium of a genus selected from the group consisting of *Bifidobacterium, Lactobacillus, Lactococcus* and *Streptococcus*.

Thus, in one embodiment the glucose fermenting microorganism may be a *lactobacillus* selected from the group consisting of *L. chungangensis, L. fujiensis, L. garvieae, L. lactis, L. piscium, L. plantarum* and *L. raffinolactis*. Preferably the glucose fermenting microorganism may be *Lactococcus lactis*.

Thus, in one embodiment the glucose fermenting microorganism may be a *lactobacillus* selected from the group consisting of *L. acetotolerans, L. acidifarinae, L. acidipiscis, L. acidophilus, L. agilis, L. algidus, L. alimentarius, L. amylolyticus, L. amylophilus, L. amylotrophicus, L. amylovorus, L. animalis, L. antri, L. apodemi, L. aviarius, L. bifermentans, L. brevis, L. buchneri, L. camelliae, L. casei, L. catenaformis, L. ceti, L. coleohominis, L. collinoides, L. composti, L. concavus, L. coryniformis, L. crispatus, L. crustorum, L. curvatus, L. delbrueckii, L. dextrinicus, L. diolivorans, L. equi, L. equigenerosi, L. farraginis, L. farciminis, L. fermentum, L. fomicalis, L. fructivorans, L. frumenti, L. fuchuensis, L. gallinarum, L. gasseri, L. gastricus, L. ghanensis, L. graminis, L. hammesii, L. hamsteri, L. harbinensis, L. hayakitensis, L. helveticus, L. hilgardii, L. homohiochii, L. iners, L. ingluviei, L. intestinalis, L. jensenii, L. johnsonii, L. kalixensis, L. kefiranofaciens, L. kefiri, L. kimchii, L. kitasatonis, L. kunkeei, L. leichmannii, L. lindneri, L. malefermentans, L. mali, L. manihotivorans, L. mindensis, L. mucosae, L. murinus, L. nagelii, L. namurensis, L. nantensis, L. oligofermentans, L. oris, L. panis, L. pantheris, L. parabrevis, L. parabuchneri, L. paracollinoides, L. parafarraginis, L. parakefiri, L. paralimentarius, L. paraplantarum, L. pentosus, L. perolens, L. plantarum, L. pontis, L. psittaci, L. rennini, L. reuteri, L. rhamnosus, L. rimae, L. rogosae, L. rossiae, L. ruminis, L. saerimneri, L. sakei, L. salivarius, L. satsumensis, L. secaliphilus, L. sharpeae, L. siliginis, L. spicheri, L. suebicus, L. thailandensis, L. ultunensis, L. vaccinostercus, L. vaginalis, L. versmoldensis, L. vini, L. vitulinus, L. zeae* and *L. zymae*, preferably the *lactobacillus* may be selected from the group consisting of *L. amylolyticus, L. delbrueckii* and *L. fermentum*.

Thus, in one embodiment the glucose fermenting microorganism may be a *Pediococcus* selected from the group consisting of *P. acidilactici, P. cellicola, P. claussenii, P. damnosus, P. dextrinicus, P. ethanolidurans, P. inopinatus, P. parvulus, P. pentosaceus* and *P. stilesii*, preferably the *Pediococcus* may be selected from the group consisting of *P. acidilactici, P. dextrinicus* and *P. pentosaceus*.

In one embodiment the glucose fermenting microorganism may be a *Gluconobacter*, such as *Gluconobacter oxydans*. *Gluconobacter* and in particular *Gluconobacter oxydans* is capable of fermenting a range of sugars to form an organic acid. Thus, for example *Gluconobacter* and in particular *Gluconobacter oxydans* may be capable of fermenting a range of sugars including maltose and glucose to obtain gluconic acid. Thus, in embodiments of the invention where the glucose fermenting microorgasnism is a *gluconobacter*, then step b) may be omitted from the methods of the invention. Accordingly, *Gluconobacter* is an example of a microorganism capable of fermenting sugar to form an organic acid.

The cereal extract may be incubated with the glucose fermenting microorganism in any suitable manner. In general the incubation is performed in a closed container or a closed vessel. In one preferred embodiment the incubation is performed in a tank connected to one or more chambers defined by two an-ion exchange membranes as described herein below in the section "REED".

The incubation may be performed for any suitable amount of time. In general the incubation may be for in the range from 12 h to 1 week, for example for in the range of 12 h to 48 h, such as for in the range of 12 h to 30 h, for example for in the range of 20 to 28 h. In general the incubation should be for a time sufficient to reduce the total level of Strecker amino acids to less than 100 mg/L, preferably less than 50 mg/L, such as less than 30 mg/L.

The incubation may be performed at any suitable temperature. Preferably, the temperature is selected to be an appropriate temperature to allow growth of the particular glucose fermenting microorganism. In general the temperature will be in the range of 15 to 40° C., such as in the range of 20 to 35° C., for example in the range of 23 to 32° C. This may in particular be the case, when the glucose fermenting microorganism is a lactic acid bacterium, such as *Lactococcus lactis*.

REED

The present invention relates to methods for reducing the content of one or more Strecker amino acids in a cereal extract as well as to methods for preparing beverages comprising a step of reducing content of one or more Strecker amino acids in a cereal extract. Surprisingly, the present inventors have found that one particularly efficient method for reducing the level of amino acids involves the steps of
 a) increasing the level of an acid or a base in the cereal extract; and
 b) removing at least part of the acidic anion of said increased acid or at least part of the basic cation of said increased base through a Reverse Electro-Enhanced Dialysis (REED) membrane stack.

In this regard it should be noted that REED treatment per se may not be sufficient to remove amino acids. Thus, under some conditions REED treatment alone may have little effect on the level of amino acids.

The term "REED" as used herein refers to a method where ions are removed from a liquid with the aid of a membrane stack consisting of
a) at least one cell consisting of:
1. two ion exchange membranes defining a chamber for the liquid to be treated; and
2. two further chambers for a dialysis liquid, wherein said two further chambers are positioned adjacent to the chamber for the liquid to be treated on opposing sides and wherein said two further chambers may be connected
b) a set of end membranes
c) means for applying an electric field over the membrane stack by means of at least two electrodes
d) means for reversing the direction of the electric field within said membrane stack
and wherein the removal involves the steps of
1. inserting the liquid to be treated into the chamber for the liquid to be treated; and
2. inserting a dialysis liquid in the two further chambers for the dialysis liquid; and
3. applying an electric field over the membrane stack; and
4. incubating said liquid to be treated in said chamber; and
5. reversing the direction of said electric field at intervals.

In the methods of the invention, the liquid to be treated is typically the cereal extract, e.g. any of the cereal extracts described herein above in the section "Cereal Extract". In general, each REED membrane stack consists of several membrane defining alternating chambers for the liquid to be treated and the dialysis liquid. The cereal extract may be maintained in a tank, which is connected to the chamber(s) for the liquid to be treated and may be circulated through the REED membrane stack. Thus, the cereal extract may be maintained in the tank and the level of acid or base may be increased in the tank for a predetermined amount of time before the cereal extract is circulated through the REED membrane stack. The cereal extract may be circulated through the REED membrane stack for a predetermined amount of time. It is also comprised within the invention that more than one REED membrane stack may be connected to the tank comprising the cereal extract. Preferably, the cereal extract may be circulated through each of the membrane stacks independently.

Regardless of the direction of the electric field, ions will be able to move from the chamber defining the liquid to be treated into either of the chambers for the dialysis liquid.

Acidic anions may in particular be removed through an Anion Exchange Reverse Electro-Enhanced Dialysis (AX-REED) membrane stack, said membrane stack containing
a) at least one cell consisting of:
i. two an-ion exchange membranes defining a chamber for the liquid to be treated; and
ii. two further chambers for a dialysis liquid, wherein said two further chambers are positioned adjacent to the chamber for the liquid to be treated on opposing sides and wherein said two further chambers may be connected
b) a set of end membranes
c) means for applying an electric field over the membrane stack by means of at least two electrodes
d) means for reversing the direction of the electric field within said membrane stack and wherein the removal involves the steps of
1. circulating liquid from the tank with cereal extract into the chamber for the liquid to be treated; and
2. inserting an alkaline dialysis liquid in the two further chambers for the dialysis liquid; and
3. applying an electric field over the membrane stack; and
4. incubating said liquid in said chamber; and
5. reversing the direction of said electric field at intervals; and
6. circulating treated liquid back to the tank.

This step may also be referred to as AX-REED treatment. In general, the AX-REED treatment is undertaken to maintain pH constant or above a predetermined level. Thus, the AX-REED is preferably adjusted compared to the continuous increase in acid, so that the continuous decrease in pH connected to the increase in acid, is counteracted by removal of acidic ions by AX-REED. It is preferred that the AX-REED treatment is adjusted to maintain pH in a range of 3 to 7, preferably the pH is maintained in a range of 4 to 6, such as in a range of 4 to 5.5, for example the pH is maintained at no more than 6. In another embodiment of the invention the pH is preferably maintained at a pH of at least 5, more preferably of at a pH of at least 5.5, such as at a pH of at least 6. Thus, in this embodiment, the pH is very preferably maintained within the range of 5.5 to 7. In embodiments of the invention, wherein the cereal extract is treated to increase the level of an acid either by addition of said acid or by using an enzyme or mixture of enzymes capable of catalysing formation of said acid, and removal of said acid using AX-REED, then it may be preferred that the AX-REED treatment is adjusted to maintain the pH at less than 5.5 or at at least 6, such as in the range of 6 to 7.5, for example in the range of 6 to 7. In embodiments of the invention, wherein the cereal extract is treated to increase the level of an acid using a microorganism capable of excreting an organic acid, and removal of said acid using AX-REED, then it may be preferred that the AX-REED is adjusted to maintaining the pH at a pH amiable to said microorganism, for example at a pH of at least 5.5, such as at a pH in the range of 5.5 to 7.5.

After AX-REED treatment it is comprised within the invention that the pH may be lowered e.g. by an acidification step. Thus, the AX-REED treatment may be adjusted to maintain pH in the above indicated range, however after AX-REED treatment the pH may be reduced, so that the pH in the final beverage is lower than the range indicated above. For example, the treated cereal extract may be subjected to an acidification step after AX-REED treatment, which may be performed in any of the manner described herein below in the section "Combined methods".

The AX-REED treatment may also be continued so that at least 50%, for example at least 60%, for example at least 70%, such as at least 80%, such as at least 90% of the added and/or generated acidic ions are removed.

Basic cations may in particular be removed through a Cation Exchange Reverse Electro-Enhanced Dialysis (CX-REED) membrane stack, said membrane stack containing
a) at least one cell consisting of:
i. two cat-ion exchange membranes defining a chamber for the liquid to be treated; and
ii. two further chambers for a second dialysis liquid, wherein said two further chambers are positioned adjacent to the chamber for the liquid to be treated on opposing sides and wherein said two further chamber may be connected
b) a set of end membranes
c) means for applying an electric field over the membrane stack by means of at least two electrodes
d) means for reversing the direction of the electric field within said membrane stack and wherein the removal involves the steps of
1. circulating liquid from the tank with cereal extract into the chamber for the liquid to be treated; and
2. inserting an acidic second dialysis liquid in the two further chambers for the second dialysis liquid; and
3. applying an electric field over the membrane stack;
4. incubating said liquid in said chamber,
5. reversing the direction of said electric field at intervals; and
6. circulating treated liquid back to the tank.

Thus, the method for reducing the level of amino acids may involve the steps of
I. inserting cereal extract into a tank connected to AX-REED membrane stack as described above and a CX-REED membrane stack as described above
II. increasing the level of an acid in the cereal extract;
III. removing at least part of the acidic anion of said increased acid in the cereal extract by AX-REED treatment as described herein
IV. removing at least part of cations in the cereal extract by CX-REED treatment as described herein.

Steps II., III. and IV. may be performed sequentially, partly simultaneously or simultaneously. Steps II., III. and IV. may also independently be repeated more than once. In a preferred embodiment the methods comprises the following steps performed in the indicated order:
1. performing step I.
2. performing step II., thereby increasing the level of acid,
3. performing steps II. and III. simultaneously, thereby increasing or maintaining pH;
4. performing steps II., III. and IV. simultaneously, thereby desalting
5. performing steps II. and IV. simultaneously, thereby acidifying OR acidifying the liquid in another manner.

In another embodiment the methods comprises the following steps performed in the indicated order:
1. performing step I.
2. performing step II., thereby increasing the level of acid,
3. performing steps II. and III. simultaneously, thereby increasing or maintaining pH;
4. performing steps III. and IV. simultaneously, thereby desalting
5. performing step IV., thereby acidifying OR acidifying the liquid in another manner.

In one embodiment the methods comprise the following steps performed in the indicated order:
1. performing step I.
2. performing step II., thereby increasing the level of acid,
3. performing step II and simultaneously increasing the level of base, thereby controlling pH,
4. performing steps II. and III. simultaneously, thereby increasing or maintaining pH;
5. performing steps II., III. and IV. simultaneously, thereby desalting
6. performing steps II. and IV. simultaneously, thereby acidifying OR acidifying the liquid in another manner.

In one embodiment the methods comprise the following steps performed in the indicated order:
1. performing step I.
2. performing step II., thereby increasing the level of acid,
3. performing step II and simultaneously increasing the level of base, thereby controlling pH,
4. performing steps II. and III. simultaneously, thereby increasing or maintaining pH;
5. performing steps III. and IV. simultaneously, thereby desalting
6. performing step IV., thereby acidifying OR acidifying the liquid in another manner.

The step acidifying may also be obtained by another method than by performing steps II and/or IV. Thus, instead of removing basic cations by CX-REED treatment, acidification may be obtained simply by the addition of acid. Acidification may also be obtained by increasing the level of acid in any of the manners described herein above in the sections "Increasing the level of acid with enzyme" or "Increasing the level of acid with microorganism", wherein the acidic anions produced are not removed by AX-REED. Acidification may be performed until a desired acidity of the beverage is obtained, for example to a pH in the range of 3 to 7, such as in the range of 4 to 6. Useful methods for acidifying the liquid are also described in the section "Combined methods" herein below.

Alternatively, the method for reducing the level of amino acids may involve the steps of
I. inserting cereal extract into a tank connected to AX-REED membrane stack as described above and a CX-REED membrane stack as described above
II. increasing the level of a base in the cereal extract;
III. removing at least part of the basic cation of said increased base in the cereal extract by CX-REED treatment as described herein
IV. removing at least part of anions in the cereal extract by AX-REED treatment as described herein.

Steps II., III. and IV. may be performed sequentially, partly simultaneously or simultaneously. Steps II., III. and IV. may also independently be repeated more than once. In a preferred embodiment the methods comprises following steps performed in the indicated order:
1. performing step I.
2. performing step II., thereby increasing the level of base,
3. performing steps II. and III. simultaneously, thereby decreasing or maintaining pH;
4. performing steps II., III. and IV. simultaneously, thereby desalting
5. performing steps II. and IV. simultaneously, thereby alkalising.

In another embodiment the methods comprises the following steps performed in the indicated order:
1. performing step I.
2. performing step II., thereby increasing the level of base,
3. performing steps II. and III. simultaneously, thereby decreasing or maintaining pH;
4. performing steps III. and IV. simultaneously, thereby desalting
5. performing step IV., thereby alkalising.

In one embodiment the methods comprise the following steps performed in the indicated order:
1. performing step I.
2. performing step II., thereby increasing the level of base,
3. performing step II and simultaneously increasing the level of acid, thereby controlling pH,
4. performing steps II. and III. simultaneously, thereby decreasing or maintaining pH;
5. performing steps II., III. and IV. simultaneously, thereby desalting
6. performing steps II. and IV. simultaneously, thereby alkalising.

In one embodiment the methods comprise the following steps performed in the indicated order:
1. performing step I.
2. performing step II., thereby increasing the level of base,
3. performing step II and simultaneously increasing the level of acid, thereby controlling pH, 4. performing steps II. and III. simultaneously, thereby decreasing or maintaining pH;
5. performing steps III. and IV. simultaneously, thereby desalting
6. performing step IV., thereby alkalising.

The tank comprises the cereal extract at the onset of the procedure, however after a while the tank will contain partly AX-REED treated liquid and/or partly CX-REED treated liquid, which also have be treated to increase the level of an acid or base. To simplify the description, the tank may never-the-less be referred to as "tank comprising cereal extract".

The AX-REED treatment and/or CX-REED treatment may be performed using REED equipment. The REED equipment according to the invention preferably comprises at least one AX-REED membrane stack and at least one CX-REED membrane stack, which may be any of the AX-REED membrane stacks described herein in this section and any of the CX-REED membrane stacks described herein in this section. Even more preferably, the REED equipment contains at least one AX-REED and at least one CX-REED membrane stack, wherein said AX-REED and said CX-REED membrane stacks are connected in parallel, and both are connected to a tank comprising the cereal extract. Thus, the REED equipment may contain one AX-REED membrane stack and one CX-REED membrane stack connected in parallel.

When two or more REED stacks are arranged in parallel the treated liquid i.e. the liquid to be treated from one REED stack is not lead directly to the next REED stack as would be the case if the two stack were connected in series. Rather the liquid is lead back to the tank.

A parallel system can for example have an AX-REED and a CX-REED connected to a reservoir and/or tank with the cereal extract. The AX-REED receives liquid to be treated from the reservoir and/or tank and said liquid to be treated is returned to the reservoir and/or system after being treated in the AX-REED stack. Simultaneously or at another time the CX-REED receives liquid to be treated from the reservoir and/or tank and said liquid is returned to the reservoir and/or tank after being treated in the CX-REED stack. It is understood that the liquid may be recirculated to the AX-REED and/or CX-REED stack from the tank.

The REED equipment may alternatively comprise more AX-REED membrane stacks than CX-REED Stacks or the REED equipment may comprise more CX-REED membrane stacks than AX-REED Stacks. The relative number of AX-REED membrane stacks/CX-REED membrane stacks than can be varied in order to regulate how much of a first component is removed from the liquid relatively to how much of a second component is removed from the liquid. The ratio between removed first component and removed second component may also me adjusted by providing AX-REED membrane stacks and CX-REED membrane stacks of different sizes.

A REED stack comprises at least one chamber for liquid to be treated and at least two chambers for dialysis liquid. The chamber(s) containing liquid to be treated and the chambers containing dialysis liquid are arranged alternatingly side by side i.e. a REED stack comprises at least three active adjacent chambers: a chamber for dialysis liquid—a chamber for liquid to be treated—a chamber for dialysis liquid. Each interface between a chamber for liquid to be treated and chamber for dialysis liquid is formed by an ion exchange membrane, which exchange membranes in the AX-REED stacks are anion exchange membranes and in the CX-REED stacks are cation exchange membranes.

Each REED stack also comprises two end membranes defining an electrode chamber at each end of the REED stack i.e. a REED stack with two end membranes comprises at least five adjacent chambers: an electrode chamber—a chamber for dialysis liquid—a chamber for liquid to be treated—a chamber for dialysis liquid—an electrode chamber.

Each electrode chamber can be formed by an end membrane and an end wall of the REED stack.

A REED stack with seven adjacent chambers, two electrode chambers and five active chambers are arranged as: an electrode chamber—a chamber for dialysis liquid—a chamber for liquid to be treated—a chamber for dialysis liquid—a chamber for liquid to be treated—a chamber for dialysis liquid—an electrode chamber. Similarly, a REED stack with another ueven number of adjacent chambers are arranged as: an electrode chamber—a chamber for dialysis liquid—[a chamber for liquid to be treated—a chamber for dialysis liquid]$_n$—an electrode chamber,
wherein n is an integer, e.g. an integer in the range of 1 to 500, such as in the range of 2 to 200, for example in the range of 2 to 50, such as in the range of 2 to 25.

Figure 8:
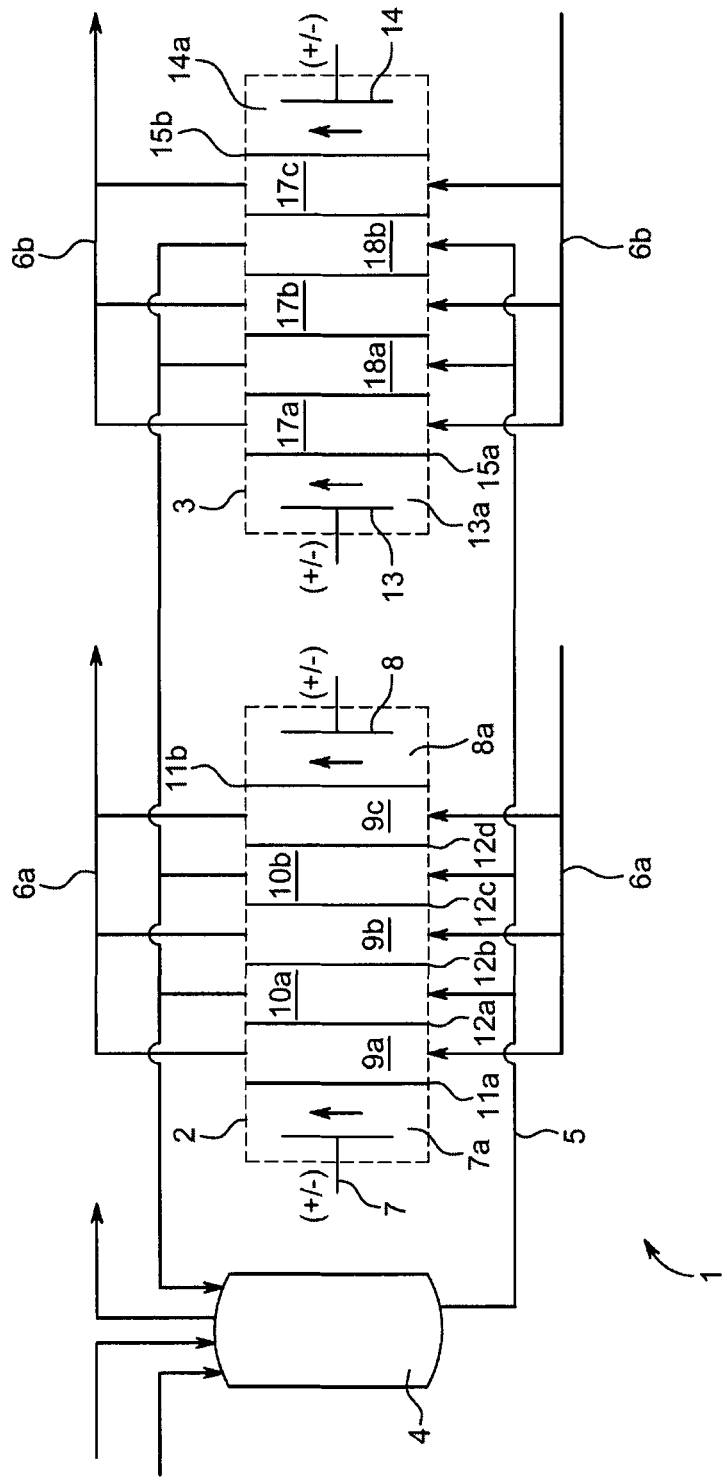
FIG. 8 shows an exemplary REED equipment.

FIG. 8 shows an exemplary REED equipment 1 to be used with the methods according to the present invention said REED equipment comprises an AX-REED stack 2 arranged in parallel with a CX-REED stack 3. Both AX-REED and CX-REED stack is connected to a tank 4 containing the cereal extract by piping 5 and to a fluid system 6a and 6b providing and leading dialysis liquids to and away from the REED stacks. The fluid system 6a is for providing the dialysis liquid to be used with AX-REED, whereas the fluid system 6b is for providing the second dialysis liquid. At the beginning of the process the tank 4 contains the cereal extract, later the tank contains the partly AX-REED and/or CX-REED treated liquid. At the end of the process the tank 4 contains the treated cereal extract.

The AX-REED stack comprises a first 7 and second 8 electrode arranged to provide an electrical field across five active chambers in between the electrodes i.e. across the alternating chambers with dialysis liquid 9 and liquid to be treated 10 formed by the membranes. In the present exemplary stack the alternating chambers are formed by:

an end membrane 11a defining at one side a first electrode chamber 7a and on the opposing side a first chamber 9 for dialysis liquid
a first anion exchange membrane 12a which together with the first end membrane defines the first chamber for dialysis liquid,
Second anion exchange membrane 12b which together with the first anion exchange membrane forms a second chamber 10a for liquid to be treated
third anion exchange membrane 12c which together with the second anion exchange membrane forms a third chamber 9b for dialysis liquid
fourth anion exchange membrane 12d which together with the third anion exchange membrane forms a fourth chamber 10b for liquid to be treated
a second end membrane 11b which together with the fourth anion exchange membrane forms a fifth chamber 9c for dialysis liquid The first and second electrodes are arranged in a first 7a and second 8a electrode chamber respectively. Said first electrode chamber is defined by a first end wall (indicated by dotted line) and the first end membrane and said second electrode chamber is defined by second end wall (also indicated by dotted line) and the second end membrane.

The exchange membranes 12a-12d can preferably be of the same type as well as the two end membranes also can be identical.

Similarly the CX-REED stack comprises two electrodes 13 and 14 one on each side of a stack of membranes said stack of membranes being a first end membrane 15a, four cation exchange membranes 16a-16d and a second end membrane 15b. Said membranes together with end walls forming a first electrode chamber 13a, a first chamber for dialysis liquid 17a, a first chamber for liquid to be treated 18a, a second chamber for dialysis liquid 17b, a second chamber for liquid to be treated 18b, a third chamber for dialysis liquid 17c and a second electrode chamber 14a.

In the present example dialysis liquid may be any of the dialysis liquid to be used with AX-REED described in this section, and the second dialysis liquid may be any of the second dialysis liquids described in this section.

The REED equipment may also contain more than one AX-REED membrane stacks connected in series, wherein said AX-REED membrane stacks are connected in parallel to at least one CX-REED membrane stack. The REED equipment may also contain more than one AX-REED membrane stacks connected in series, and more than one CX-REED membrane stacks connected in series, wherein said AX-membrane stacks and CX-REED membrane stacks are connected to each other in parallel. Even though less preferred the REED equipment may also contain an AX-REED and a CX-REED membrane stack connected in series, wherein one of the stacks is connected to the reservoir and/or tank via its inlet, whereas the other is connected to the tank via its outlet.

Each AX-REED membrane stack may comprise more than one cell as identified above. For example each AX-REED membrane stack may comprise in the range of 2 to 500 cells, such as in the range of 2 to 200 cells, such as in the range of 2 to 25 cells.

The removal of the acidic ion typically involves the steps of
1. inserting the liquid to be treated into the chamber for the liquid to be treated; and
2. inserting a dialysis liquid in the two further chambers for the dialysis liquid; and
3. applying an electric field over the membrane stack; and
4. incubating said liquid to be treated in said chamber; and
5. reversing the direction of said electric field at intervals AX-REED may be performed under circulation meaning that after incubation of the liquid to be treated in said chamber the resulting liquid may be removed from the chamber and later inserted into another chamber for the liquid to be treated or even into the same chamber for the liquid to be treated. When inserted into the same chamber, then frequently the dialysis liquid in said two further chambers has been exchanged for a fresh dialysis liquid.

When more than one membrane stack is employed the liquid to be treated may be inserted into each of the chambers for the liquid to be treated separately. Alternatively, some or all of said chambers may be connected, so that some or all of the chambers may be fed simultaneously. Similarly, the dialysis liquid may be inserted into each of the chambers for the dialysis liquid separately. Alternatively, some or all of said chambers may be connected, so that some or all chambers are fed simultaneously.

The acidic ion to be removed may for example be the anion of any organic acid, for example the anion of any of the organic acids, described herein above in the section "Reducing the content of amino acids with dialysis". Preferably at least the acidic anion being increased by addition and/or by generation with the aid of an enzyme or microorganism is being removed through AX-REED treatment.

Interestingly, as disclosed by the current invention, under such conditions also Strecker amino acids are being removed. Amino acids comprise both an acidic —COOH group as well as an alkaline —NH$_2$ group. A few amino acids also contain other charged groups, but all Strecker amino acids are non-polar amino acids having a non-polar side chain. This is also reflected by the pI of all the Strecker amino acids, which is close to neutral lying in the range around 5.5 to 6. Interestingly, even at lower pH, amino acids are still being effectively reduced by the methods described herein. Thus in one embodiment of the invention the REED treatment is performed in a manner so that pH is maintained in the range of 3 to 7, such as in the range of 4 to 6, for example in the range of 4 to 5.5, such as at no more than 6 throughout the REED treatment.

During removal of the acidic ion, the two membranes surrounding the chamber for the liquid to be treated either facilitates the transport of ions out of the liquid to be treated or into the liquid to be treated from the dialysis liquid.

The direction of the electric field is changed at intervals. Each reversal of the direction of the electric field results in a short-term reestablishment of the affected ions' polarization profiles at the surface and inside the membranes, as the two membranes surrounding each feed compartment exchanges functions. This causes a short-term reversal of the separation process as the ions previously being removed are pushed back into the feed solution until the membrane profiles are re-established. It is advantageous to keep the intervals between current reversals within any one REED stack as long as allowed by the build-up of fouling, as each reversal introduces a short separation pause and introduces minor process instability.

The methods of the invention may involve use of more than one AX-REED membrane stack. The membrane stacks may be stacked (commonly separated by membrane spacers) on top of each other or side by side until sufficient membrane separation area is achieved. For feasible handling, operational, and maintenance purposes, the membrane stacks may be operated in several separate, practically sized membrane stacks, each with its own set of flow connections and electrodes, but with the same separation function. These stacks are operated together in parallel or serial or some combination thereof as part of the same separation system. It is advantageous to operate with multiple AX-REED membrane stacks, when more than one set of electrodes are used. The number of AX-REED membrane stacks may thus vary from 2 to several hundred depending on the process in question, but are typically in the range 2-50 AX-REED membrane stacks, more typically in the range of 4-20 membrane stacks.

The dialysis liquid to be used with AX-REED according to the invention may be any alkaline solution. Typically it is an aqueous solution of a cation-OH, wherein said cation typically may be the cation of a metal. For example the dialysis liquid may comprise one or more bases selected from the group consisting of Ca(OH)$_2$, Mg(OH)$_2$, KOH, and NaOH, preferably from the group consisting of Ca(OH)$_2$, Mg(OH)$_2$ and KOH, The dialysis liquid will typically contain said base in a concentration of in the range of 0.01 to 30%, preferably in the range of 0.01 to 20%, more preferably in the range of 0.01 to 150%, for example in the range of 0.01 to 10%. In certain embodiments said base is used in a concentration of in the range of 0.01 to 6%. This may in particular be the case, when the dialysis liquid is used only once. All percentages are provided as w/w.

In the case of AX-REED, acidic ions are extracted through anion-exchange membranes in each chamber of the AX-REED membrane stack, while typically hydroxide ions enter through the opposite anion-exchange membrane. When the direction of the electrical field is reversed, the extracted acidic ions inside the first mentioned membrane is pushed back into the liquid to be treated, before hydroxide ions starts entering the liquid to be treated. Thus, in the short time period until the hydroxide profile is re-established through the membrane, which was previously used to extract acidic ions, no pH control is observed. The length of the time phase after each current reversal until pH control is regenerated depends on various process conditions and membrane properties; typically, it takes between 30 to 180 seconds before the process is again operating at optimal process parameter control. This is registered as a sudden change in the process parameter e.g. pH, which must then be regulated back to the desired set-point. In order to spread out the instability effects and reduce the overall impact of current reversals with more than one membrane stack, the reversals of the electric field on each separate stack are preferably performed asynchronically. Thus, it is preferred with the invention that more than one AX-REED membrane stack is employed and that the electric field on each separate stack is reversed asynchronically. Even though the intervals for reserving the electrical field of each stack are typically of similar length, the timing of the reversals is dispersed for best process stability effect.

In an embodiment of the invention the direction of the electric field within any first membrane stack is reversed at substantially regular dispersal intervals relative to the reversals for any second or further membrane stack.

The interval length between current reversals for a stack is typically chosen with regard to the build-up of membrane fouling. Typically, said intervals within any one REED stack may be in the range 5-6000 seconds, preferably 8-3000 seconds, more preferably 10-2000 seconds and even more preferably 100-1500 seconds.

In another embodiment of the invention the direction of the electric field within any first membrane stack is reversed at dispersal intervals of substantially even length relative to the reversals for any second or further membrane stack in order to maximise the time between a current reversal of any first REED stack and any second or further REED stack in the same process. With the same dispersal interval length between current reversals, i.e. where these reversals are dispersed evenly the connected reservoir and/or tank will experience a reduced impact, but much more often.

In an embodiment of the invention the intensity of the applied electric field is adjusted in response to the pH, salt concentration or conductivity of the liquid to be treated. By increasing the intensity of the electric field, the ion exchange increases in the REED system, and vice versa. Online, semi-online (e.g. time-delayed) or secondary (e.g. using online conductivity or turbidity measurements for estimating target ion concentration) measurements of the process parameters being regulated are input in a control regulation mechanism e.g. PID-control software, which in turn regulates the output of the power supplies to the REED electrodes.

The current reversal is not the only effect, which can introduce deviations in process control. For optimal control of process parameters, it may be advantageous to control the concentration of various ions in the dialysis liquid as well as the flow and temperature and mode of operation. With regard to temperature, then the temperature in the reservoir and/or tank is typically selected in order to allow growth of the microorganism or high activity of the enzyme.

If multiple stacks are used it is possible to set up the flow of the dialysis liquid either in parallel, or in serial mode with or without booster pumps between stacks, in a similar fashion as with the liquid to be treated.

In embodiments of the invention wherein the level of acid is increased, then Anion-Exchange REED (AX-REED) in general serves to replace produced organic acids with hydroxide ions, and thus, countering the reduction of pH from the acid-formation. By regulation of the AX-REED, the hydroxide exchange can maintain pH during fermentation without the need for neutraliser addition.

In the context of this invention the term "reversal of the electric field" or "current reversal" means the changing of polarity of the REED electrodes, resulting in a reversal of the direction of the electrical DC current, which facilitates the migration of ions through the ion-exchange membranes.

The anion exchange membranes may be any useful anion exchange membranes. The size of the membranes may be selected in order to achieve a suitable membrane area compared to the volume of cereal extract to be treated.

Non-limiting examples of useful anion exchange membranes include Ionic AR103 (GE, USA), Neosepta ASM (Astom Corp., Japan), Fumatech FAB (Fumatech, Germany).

Non-limiting examples of useful methods and equipment for performing AX-REED are also described in European patent applications EP 1 347 823, EP2349541 and EP2349540, all of which are incorporated by reference herein.

In some embodiments AX-REED treatment is performed first and then AX-REED and CX-REED are performed simultaneously in parallel. In other embodiments CX-REED treatment is performed first and then AX-REED and CX-REED are performed simultaneously in parallel. AX-REED treatment will typically lead to de-acidification, CX-REED treatment will typically lead to acidification, wherein performing AX-REED and CX-REED simultaneously leads to desalting of the liquid to be treated.

Regardless of the direction of the electric field ions will be able to move from the chamber for the liquid to be treated into one of the chambers for the second dialysis liquid.

Each CX-REED membrane stack may comprise more than one cell as identified above. For example each CX-REED membrane stack may comprise in the range of 2 to 500 cells, such as in the range of 2 to 200 cells, for example in the range of 2 to 50, such as in the range of 2 to 25 cells.

CX-REED may be performed under circulation, meaning that after incubation of the liquid to be treated in said chamber the resulting liquid may be removed from the chamber and later inserted into another chamber for the liquid to be treated or even into the same chamber. When inserted into the same chamber, then frequently the second dialysis liquid in the two adjacent further chambers has been exchanged for a fresh second dialysis liquid.

The cation to be removed may be any cation. In embodiments of the invention, wherein AX-REED treatment is first performed alone, then it may be one or more cations introduced into liquid from the dialysis liquid during AX-REED treatment. Thus, the cation may for example be any of the cations of a base included in the dialysis liquid as described herein above. In embodiments of the invention where the level of base is increased, then the cation may in particular be the basic cation of said base being increased.

During removal of said cation, the two membranes surrounding the chamber for the liquid to be treated either facilitates the transport of ions out of the liquid to be treated or into said liquid from the second dialysis liquid.

The direction of the electric field is changed at intervals in a manner similar to what is described herein above for AX-REED.

The methods of the invention may involve use of more than one CX-REED membrane stack. The membrane stacks may be stacked (commonly separated by membrane spacers) on top of each other or side by side until sufficient membrane separation area is achieved to obtained a desired capacity. For feasible handling, operational, and maintenance purposes, the membrane stacks may be operated in several separate, practically sized membrane stacks, each with its own set of flow connections and electrodes, but with the same separation function. These stacks are operated together in parallel or serial or some combination thereof as part of the same separation system. It is advantageous to operate with multiple CX-REED membrane stacks, when more than one set of electrodes are used. The number of CX-REED membrane stacks may thus vary from 2 to several hundred depending on the process in question, but are typically in the range 2-50 CX-REED membrane stacks, more typically in the range of 4-20 membrane stacks.

The second dialysis liquid to be used with CX-REED according to the invention may be any acidic solution. Typically it is an aqueous solution of a H-anion, wherein the anion typically is an inorganic anion. Thus, for example the second dialysis liquid may comprise one or more acids selected from the group consisting of $H_3PO_4$, $HNO_3$ and $H_2SO_4$. Preferably, the second dialysis liquid comprises $H_3PO_4$. The second dialysis liquid will typically contain said acid in a concentration in the range of 0.01 to 30%, preferably in the range of 0.01 to 20%, more preferably in the range of 0.01 to 10%, for example in the range of 0.01 to 6%. The percentages are provided as w/w.

In the case of CX-REED, cations are extracted through one cation-exchange membrane of each cell of the CX-REED membrane stack(s), while typically $H^+$ ions enter through the opposite cation-exchange membrane. When the direction of the electrical field is reversed, the extracted cations inside the first mentioned membrane is pushed back into the liquid to be treated, before $H^+$ ions starts entering the liquid to be treated. In order to spread out the instability effects and reduce the overall impact of current reversals with more than one membrane stack, the reversals of the electric field on each separate stack are preferably performed asynchronically. Thus, it is preferred with the invention that more than one CX-REED membrane stack is employed and that the electric field on each separate stack is reversed asynchronically. Even though the intervals for reserving the electrical field of each stack are typically of similar length, the timing of the reversals is dispersed for best process stability effect.

In an embodiment of the invention the direction of the electric field within any first membrane stack is reversed at substantially regular dispersal intervals relative to the reversals for any second or further membrane stack.

The interval length between current reversals for a stack is typically chosen with regard to the build-up of membrane fouling. Typically, said intervals within any one CX-REED stack may be in the range 5-6000 seconds, preferably 8-3000 seconds, more preferably 10-2000 seconds and even more preferably 100-1500 seconds.

In another embodiment of the invention the direction of the electric field within any first membrane stack is reversed at dispersal intervals of substantially even length relative to the reversals for any second or further membrane stack in order to maximise the time between a current reversal of any first CX-REED stack and any second or further CX-REED stack in the same process. With the same dispersal interval length between current reversals, i.e. where these reversals are dispersed evenly the connected bioreactor will experience a reduced impact, but much more often.

In an embodiment of the invention the intensity of the applied electric field is adjusted in response to the pH, salt concentration or conductivity of said liquid composition. By increasing the intensity of the electric field, the ion exchange increases in the CX-REED system, and vice versa. Online, semi-online (e.g. time-delayed) or secondary (e.g. using online conductivity or turbidity measurements for estimating target ion concentration) measurements of the process parameters being regulated are input in a control regulation mechanism e.g. PID-control software, which in turn regulates the output of the power supplies to the CX-REED electrodes.

The reversal of electrical field is not the only effect, which can introduce deviations in process control. For optimal control of process parameters, it may be advantageous to control the concentration of various ions in the second dialysis liquid as well as the flow and temperature and mode of operation.

If multiple stacks are used it is possible to set up the flow of the second dialysis liquid either in parallel, or in serial mode with or without booster pumps between stacks.

The cation exchange membranes may be any useful cation exchange membranes. The size of the membranes may be selected in order to achieve a suitable retention time. For calculating the retention time, the total area of the anion membranes used is of interest. Accordingly, if the method employs use of many membrane stacks and/or if each membrane stack contains many cells, then the area of each membrane may be reduced.

Non-limiting examples of useful CX-membranes includes Nafion N117 (Dupont) and Neosepta CMB (Astom Corp., Japan).

Non-limiting examples of useful methods and equipment for performing AX-REED are also described in European patent applications EP 1 347 823, EP2349541 and EP2349540, all of which are incorporated by reference herein.

In general the Cation-Exchange REED (CX-REED) serves to replace cations with hydrogen ions. Thus, when AX-REED and CX-REED are operated simultaneously then cations are exchanged for hydrogen ions, and anions are exchanged of hydroxide ions. The hydrogen ions and the hydroxide ions transported into the liquid may together form water leading to a desalting. Thus, by operating AX-REED and CX-REED simultaneously the conductivity may be decreased. It is preferred that AX-REED treatment and CX-REED treatment are performed simultaneously for at time sufficient to obtain a treated cereal extract with a suitable conductivity. Said conductivity is preferably at the most 7 mS/cm, preferably at the most 6 mS/cm, even more preferably at the most 5 mS/cm, for example in the range of 1 to 5 mS/cm, such as in the range of 1 to 5 mS/cm, for example in the range of 1 to 4.5 mS/cm, for example approx. 4.5. If the liquid has a higher conductivity, then simultaneous operation of AX-REED and CX-REED may be continued until the liquid has the desired conductivity. In general, a higher conductivity than 5 mS/cm is less desirable in the treated cereal extract, because this may cause a salty taste.

Reducing the Content of Amino Acids with Oxidising Agent

The methods of the invention comprise a step of reducing the content of one or more amino acid selected from the group consisting of methionine, phenylalanine, valine, leucine and isoleucine.

In one embodiment said step comprises incubating the cereal extract with an oxidising agent. This is in particular relevant in embodiments of the invention wherein said step of reducing the content of amino acids is a step of reducing the content of methionine.

Said oxidising agent may be any useful oxidising agent. It is of importance that the oxidising agent can be used for the preparation of beverages. For example the oxidising agent may be selected from the group consisting of peroxides and ozone ($O_3$). Non-limiting examples of useful peroxides include $H_2O_2$ and peracetic acid.

It may be an advantage to use an oxidising agent, which can be inactivated. This allows for better control of the reaction. For example, peroxides such as $H_2O_2$ are useful because they can be inactivated e.g. by catalases.

In particular it is preferred that the oxidising agent is an inorganic peroxide. In particular it is preferred that the oxidising agent is $H_2O_2$.

The cereal extract is preferably incubated for an amount of time and under conditions resulting in a reduction of the content of methionine in the treated cereal extract, so that said treated cereal extract contains at the most 15 mg/L, such as of the most 10 mg/L, for example of at the most 5 mg/L, such as at the most 3 mg/L methionine.

For example said cereal extract may be incubated with at least 20 ppm $H_2O_2$, such as at least 40 ppm $H_2O_2$, such as at least 50 ppm $H_2O_2$, for example at least 100 ppm $H_2O_2$, such as at least 250 ppm $H_2O_2$, for example in the range of 20 to 10000 ppm $H_2O_2$, for example in the range of 20 to 5000 ppm $H_2O_2$, for example in the range of 20 to 2500 ppm $H_2O_2$, for example in the range of 50 to 10000 ppm $H_2O_2$, for example in the range of 50 to 5000 ppm $H_2O_2$, for example in the range of 50 to 2500 ppm $H_2O_2$, for example in the range of 250 to 10000 ppm $H_2O_2$, for example in the range of 250 to 5000 ppm $H_2O_2$, for example in the range of 250 to 2500 ppm $H_2O_2$. The incubation may be for in the range of 1 to 30 hours. In embodiments wherein the level of $H_2O_2$ is at least 100 ppm, such as at least 250 ppm, then incubation is preferably for in the range of 1 to 10 hours, such as in the range of 4 to 5 hours.

Contrary to the belief of the prior art, that oxidation is harmful to the taste of beverages, the present invention interestingly discloses that oxidation may be an advantage.

In one embodiment of the invention the oxidising agent may not be added directly to the cereal extract, but instead an enzyme is added, which can catalyse the formation of the oxidising agent. Thus, it is comprised within the invention, that the content of Strecker amino acids, and in particular the content of methionine can be reduced by incubation of the cereal extract with an enzyme or a mixture of enzymes capable of catalysing formation of $H_2O_2$. Said enzyme capable of catalysing formation of $H_2O_2$ may be any useful enzyme. For example it may be any of the glucose oxidases described herein above in the section "Increasing level of acid with enzyme".

As described herein above in the section "Increasing level of acid with enzyme", then glucose oxidase catalyses formation of both acid and $H_2O_2$, and thus typically methods wherein $H_2O_2$ is formed with the aid of glucose oxidase, involves removing at least part of the acidic anion in the cereal extract by AX-REED treatment as described herein above. In embodiments of the invention, where said acidic anion is not removed by AX-REED, then it may be preferred that the treated cereal extract is not subjected to subsequent alcohol fermentation.

However, in general wort which has been treated with an oxidising agent such as $H_2O_2$, may be processed further into a beverage e.g. said wort may be subjected to conventional alcohol fermentation. Thus the beverage may be a beer brewed with wort, which has been treated with an oxidising agent, rather than with standard wort.

The invention thus in one aspect relates a method for producing a flavour stable cereal based beverage, said method comprising the steps of:
i) providing a cereal extract comprising at least 25 mg/L methionine;
ii) treating said cereal extract with an oxidising agent (e.g. $H_2O_2$) to reduce the content of methionine, thereby obtaining a treated cereal extract;
iii) processing said treated cereal extract into a beverage, e.g. by fermentation,
wherein said beverage has a content of methionine of less than 5 mg/L.

Combined Methods

It is also comprised within the invention that the various methods for reducing the level of amino acids described herein are combined.

Thus, in one embodiment of the invention, the invention relates to methods for producing a flavour stable cereal based beverage, said method comprising the steps of:
i) providing a cereal extract comprising at least 25 mg/L methionine, e.g. any of the cereal extracts described herein above in the section "Cereal extract";
ii) inserting cereal extract into a tank connected to AX-REED membrane stack as described above and a CX-REED membrane stack as described above
iii) increasing the level of an acid in the cereal extract using a microorganism capable of fermenting a sugar to form an organic acid, wherein the microorganism may be any of the microorganisms described herein above in the section "Increasing level of acid with microorganism";
iv) removing at least part of the acidic anion of said increased acid in the cereal extract by AX-REED treatment as described herein while maintaining the pH in the range of 5.5 to 7,
v) acidifying said liquid by one of the methods described below
vi) thereby obtaining a treated cereal extract;
vii) optionally further processing said treated cereal extract into a beverage e.g. as described herein below in the section "Processing into beverage".

The method may also comprise a step of desalting. The step of desalting may for example comprise removing at least part of the acidic anions in the cereal extract by AX-REED treatment and removing at least part of the cations in the cereal extract by CX-REED treatment as described herein above. In particular, said AX-REED and said CX-REED treatment may be performed simultaneously. Said step of desalting may preferably be performed after step iv), more preferably between steps iv) and v).

Said step of acidifying may be performed in any useful manner. In one embodiment the acidification is obtained by removing basic cations by CX-treatment as described herein. Said CX-REED treatment may be performed until a desired acidic pH is achieved, for example a pH in the range of 3 to 7, such as a pH in the range of 4 to 6. In such embodiments it is preferred that the method comprises a step of desalting between steps iv) and v). The acidification may also be obtained by allowing the microorganism to continue fermentation without the action of either AX-REED or CX-REED until a desired pH is achieved. Since the bacteria continuously produce an organic acid, then the liquid will continuously get more acidic if said acid is not removed by AX-REED. In such embodiments of the invention the step of desalting may not be relevant. The acidification may also be obtained by treatment with an enzyme or mixture of enzymes capable of catalysing formation of an acid. Said enzyme or mixture of enzymes may be any one of the enzymes/mixtures described herein above in the section "Increasing the level of acid with Enzyme". If the acidification is performed with the aid of an enzyme, the liquid may be treated to remove the microorganism prior to incubation with enzyme. Since the enzyme continuously produce an organic acid, then the liquid will continuously get more acidic if said acid is not removed by AX-REED. In such embodiments of the invention the step of desalting may not be relevant.

The method may also contain an additional step of treating the treated cereal extract with an oxidising agent, which may be any of the oxidising agents described herein above in the section "Oxidising agent". This may in particular be relevant in embodiments of the invention wherein the acidification is performed using CX-treatment or using continued fermentation. In embodiments of the invention where the acidification is performed using an enzyme or mixture of enzymes capable of catalysing formation of an acid, then frequently said enzyme also catalyses formation of $H_2O_2$, which may be sufficient. Said step of treatment with an oxidising agent may preferably be performed after step v), such as between steps v) and vi)

Processing into Beverage

The invention provides methods for producing a beverage. Once a treated cereal extract with reduced content of Strecker amino acids has been prepared, it may then be processed into a beverage. It is comprised within the invention that the treated cereal extract is a beverage per se, however in most instances additional processing steps are required to arrive at the final beverage.

In one embodiment the treated cereal extract is being subjected to a fermentation step. This is in particular the case in embodiments of the invention, wherein the cereal extract still have a total content of the amino acids methionine, phenylalanine, valine, leucine and isoleucine of at the most 300 mg/L, more preferably at the most 250 mg/L.

Thus, the cereal extract may be subjected to conventional fermentation similar to conventional fermentation used for preparation of beer. The skilled person is well aware of useful fermentation methods used in the preparation of beer. In brief fermentation may involve incubating the treated cereal extract with a microorganism for a predetermined amount of time. The incubation is in general performed under anaerobic conditions.

It is preferred that the microorganism is a microorganism capable of fermenting sugar to alcohol. Thus, a preferred microorganism to be used for the fermentation of the treated cereal extract is yeast, more preferably a yeast capable of producing ethanol. In particular, it is preferred that the yeast is capable of fermenting sugar (such as glucose and/or maltose) to obtain ethanol. Useful yeast include Brewer's yeast, for example yeast *Saccharomyces cerevisiae* or *Saccharomyces pastorianus*, formerly known as *S. carlsbergensis*.

It is also comprised within the invention that the treated cereal extract may be treated before it is subjected to fermentation. For example, one or more additional compounds may be added to the treated cereal extract, such as any of the additional compounds described herein below in the section "Additional compound". The treated cereal extract may also be diluted with water, for example in order to obtain a desired content of sugar prior to fermentation. The treated cereal extract may also be mixed with one or more liquids, for example the treated cereal extract may be mixed with another cereal extract. This may result in a combined cereal extract with a reduced level of one or more Strecker amino acids, which may be useful as a starting material for fermentation.

After completion of fermentation, the fermented treated cereal extract may be the final beverage. However, additional processing may also be undertaken, such as filtration, cooling or carbonisation. One or more additional compounds may also be added to the beverage after fermentation, such as any of the additional compounds mentioned below in the section "Additional compound".

In other embodiments of the invention, the beverage is not subjected to fermentation with an alcohol producing yeast strain, Thus is some embodiments of the invention, the beverage may preferably be a non-alcoholic beverage.

Step iii) of processing the treated cereal extract into a beverage may also just comprise or even consist of conventional processing steps, such as filtration, cooling and/or carbonisation. One or more additional compounds may also be added to the treated cereal extract, such as any of the additional compounds mentioned below in the section "Additional compound". Furthermore, the treated cereal extract may be mixed with one or more other liquid, for example with another beverage in order to obtain a mixed beverage.

Additional Compound

The methods of the invention may comprise a step of adding one or more additional compound(s). The additional compound may for example be a flavor compound, a preservative or a functional ingredient.

The flavor compound may be any of the flavor compounds described herein below in the section "Flavor compound".

Functional ingredients may be any ingredient added to obtain a given function. Preferably a functional ingredient renders the beverage more healthy. Non-limiting examples of functional ingredients includes soluble fibres, proteins, added vitamins or minerals.

The preservative may be any food grade preservative, for example it may be benzoic acid, sorbic acid, sulphites and/or salts thereof.

The additional compound may also be $CO_2$. In particular, $CO_2$ may be added to obtain a carbonated beverage.

The flavour compound to be used with the present invention may be any useful flavour compound. The flavour compound may for example be selected from the group consisting of aromas, plant extracts, plant concentrates, plant parts and herbal infusions.

Thus, the flavour compound may for example be an aroma. Aromas are typically organic compounds, for example they may be plant secondary metabolites. The aroma may be any aroma, for example a fruit aroma or vanilla aroma.

The plant extract may for example be a herbal extract. Non-limiting examples of herbal extracts includes an extract of green tea, black tea, rooibos, peppermint or hops. The plant extract may also be a flower extract. Non limiting examples of flower extracts include hibiscus camomile, elderflower, lavender or linden flower.

The plant extract may also be a fruit extract. Plant parts may for example be dried or fresh herbs, such as hops pellets, dried of fresh flowers or fruits.

The plant concentrate may be a fruit concentrate, for example a fruit juice, which has been concentrated by removal of water.

Non-limiting examples of fruits useful for fruit aroma, fruit extract or fruit concentrates include orange, apple, banana, lemon, passion fruit, mango, pineapple, pears, kumquats or pomelo, The flavor compound may also be quinine, for example in embodiments where the beverage is a tonic like beverage.

Property of Beverages

The present invention relates to methods for preparing beverages. Said beverage may be any beverage based on cereal extract, for example the beverage may be a malt based beverage, such as a fermented malt base beverage. In particular, the beverage may be beer. The beverage may also be a non-alcoholic malt based beverage, such as maltinas. The beverage may also be another non-alcoholic beverage.

In a preferred embodiment of the invention the beverage is beer. This may be any kind of beer known to the person skilled in the art. In one embodiment, the beer is, for example, a lager beer. The beer may also be a low-alcohol beer.

It is preferred that before storage said beverage contains a low level of amino acids. Thus, it is preferred that the beverages has a total content of the amino acids methionine, phenylalanine, valine, leucine and isoleucine of at the most 100 mg/L, more preferably at the most 50 m/L, even more preferably at the most 25 mg/L, even more preferably at the most 10 mg/L, yet more preferably at the most 5 mg/L. In addition it is preferred that the beverage has a content of methionine of at the most 15 mg/L, such as of the most 10 mg/L, for example of at the most 5 mg/L, such as at the most 3 mg/L.

However, the acceptable level of Strecker amino acids may vary from beverage to beverage. Thus, in some embodiments of the invention, and in particular in embodiments of the invention wherein the content of amino acids has been reduced with the aid of REED treatment it may be acceptable that the level of amino acids is somewhat higher than indicated above. Thus, in some embodiments of the invention the beverages may have a total content of the amino acids methionine, phenylalanine, valine, leucine and isoleucine of at the most 200 mg/L, more preferably at the most 150 m/L, even more preferably at the most 100 mg/L.

It is also preferred that the beverage develops few aging flavours. Thus, preferably the beverage has a total aging score of at the most 2, for example of at the most 1.5 after storage for 2 weeks as 37° C. It is also preferred that said beverage has a total aging score of at the most 2, for example of at the most 1.5 after storage for 2 months at 20° C. It is also preferred that said beverage has a total aging score of at the most 2, for example of at the most 1.5 after storage for 4 months at 20° C. It is also preferred that said beverage has a total aging score of at the most 2, for example of at the most 1.7 after storage for 6 months at 20° C. Said total aging score is determined on a scale from 0 to 5, with 0 being "not aged" and 5 being "strongly aged" by a trained taste panel of at least 10 individuals. Preferably, said total aging score is determined as described herein below in Example 4.

SEQUENCE LISTING

| | |
|---|---|
| SEQ ID NO: 1 | Amino acid sequence of glucose oxidase of *Aspergillus niger* |
| SEQ ID NO: 2 | Amino acid sequence of glucose oxidase of *Penicillium amagasakiense* |

EXAMPLES

The invention is further illustrated by the following examples, which however should not be construed as being limiting for the invention.

Example 1

Preparation of Glucose Wort

A wort of 14.5% P, with a high content of glucose, was produced by mashing a standard Pilsner malt together with commercial brewing enzymes. Milled Pilsner malt was mashed-in with standard brewing water at 63° C., at a ratio of 1 kg malt to 3 L water. Just after mixing milled malt with water, commercial enzyme preparations containing alpha-glucosidase, α-amylase, and limit-dextrinase activities were added, which are capable of converting carbohydrates and oligosaccharides to glucose. Calcium chloride was also added, and pH was adjusted to approx. 5.2 by addition of phosphoric acid. After 30 minutes at 63° C., the temperature was increased to 70° C. at a rate of 1° C./minute, kept at 70° C. for 60 minutes, increased to 78° C. at a rate of 1° C./minute, and finally kept at 78° C. for 5 minutes. The mash was then filtrated and sparged, resulting in a total volume of sweet wort which was ca. 75% higher than the original volume of water added to the malt. The sweet wort was adjusted to pH ca. 5.2 by addition of phosphoric acid, and calcium chloride was added. The wort was then boiled 70 minutes. During this period, some water evaporated, leaving a total volume of boiled wort which was ca. 67% higher than the original volume of water added to the malt. In this way, a total of ca. 5.0 L boiled wort was obtained from 1 kg malt. After a whirlpool process to remove sediments, the boiled wort was filled into kegs and kept at 5° C. until further processing. This wort, and worts produced in essentially the same way, may herein be referred to as "glucose wort".

REED Assisted Enzymatic Conversion of Glucose to Gluconic Acid

Experimental Lab-REED Setup

The experimental setup entailed a 5 L bioreactor vessel integrated in a Biostat B fermentation system (B. Braun Biotech International, now Sartorius Stedim Systems, DE) for optional control of temperature, oxygen level, stirring speed and initial pH adjustment with KOH. In a closed Feed circuit two REED membrane stacks (JS-9 from Jurag Separation, DK) were connected in parallel to the bioreactor. One stack, the AX-REED, was equipped with 3 cell pairs using 6 anion exchange membranes (AR103-QDP from Ionics, US) between the Feed and Dialysate compartments and 2 cation exchange membranes (Nafion N117 from DuPont, US) as end-membranes. Each cell pair had an active membrane area of 915 cm$^2$ and comprised a set of 2 mm thick tortuous-path membrane spacers. The other stack was equipped as a CX-REED (JS-9) with 1 cell pair using 2 cation exchange (CMB-sb from Astom, JP) on each side of the Feed compartment and 2 end-membranes (FAB from Fumatech, Del.), one between Dialysate compartment and Electrode compartment in each end of the stack. The AX-REED and CX-REED were supplied through two separate circuits with 3-10 L Dialysate ranging from 0-1 M KOH and 0-1 M $H_3PO_4$, respectively. In both stacks an electrode rinse solution consisting of 3 L of 1 M Sodium hydrogen phosphate at neutral pH was circulated using a centrifugal pump (Eheim 1260 from Eheim, Del.). For circulation of Feed and Dialysate solutions 3 separate pumps (FH100 from Fisher Scientific, US) were used. Electrical current control and data logging for the 2 stacks were done by a REED Control Module (Model 2008.01-1500 from Jurag Separation, DK) connected to a laptop PC.

With the above described equipment it is possible to control pH of an acid generating mixture by exchanging anions for $OH^-$ using the AX-REED. Another possibility is to desalt the mixture by exchanging cation for $H^+$ using the CX-REED and anions for $OH^-$ using the AX-REED. Finally, it is possible to acidify the mixture by only using the CX-REED to exchange cation for $H^+$.

Experimental Procedure and Results

5 L glucose wort was transferred to the bioreactor and heated to 40° C. The wort had a conductivity of 2.27 mS/cm$^2$, and pH was 5.2. Oxygen was supplied from a pressurized tank (52% oxygen) and dispersed in the reactor by stirring to keep an oxygen saturation of 30%. At time=0, a 1-ml aliquot of an enzyme preparation containing both glucose oxidase activity and catalase activity was added. A gradual drop in pH was observed due to conversion of glucose to gluconic acid and hydrogen peroxide. When pH reached 4.2, after ca. 20 min., automatic titration with 46% KOH was started in order to keep pH at 4.2. At time=1.83 hours after enzyme addition the conductivity had increased to 4.82 mS/cm and the REED system was connected and took over pH control at pH 4.2. The AX dialysate solution was 8 L 0.5 M KOH and the CX dialysate was 3 L DI water. At time=2.25 hours, 6.33 hours, and 10.42 hours, new 1-mL aliquots of enzyme were added. After 9 hours the conductivity was ca. 6 mS/cm and desalting was started by adding 100 ml $H_3PO_4$ to the CX dialysate. At 11 hours, the trial was terminated at a pH of 4.2 and a conductivity of 4.17 mS/cm.

Throughout this trial (A), aliquots were taken for analyses. Fresh samples contained small amounts of hydrogen peroxide, but never in excess of ca. 50 ppm estimated with peroxide test strips from Merckoquant (Merck). After peroxide test and conductivity measurement, the samples were heated to 80° C. for 10 minutes in order to inactivate the enzyme activities and then centrifuged at 4000 rpm for 10 minutes. After this treatment, no hydrogen peroxide could be detected. Samples were frozen until further analysis.

The samples from Trial A were analysed for free amino acids by a standard HPLC method. The analyses showed that the contents of amino acids decreased considerably during the trial. Fejl! Henvisningskilde ikke fundet. shows the reduction in the contents of methionine, valine, isoleucine, leucine, and phenylalanine in wort during Trial A. These amino acids are precursors for the staling aldehydes which develop in beverages during storage.

The experiment was repeated using essentially the same procedure. However, pH was increased to 5.5 by titration with 46% KOH, and pH set-point during REED processing was kept at 5.5 throughout the trial. This trial (B) was also carried out at 40° C. and terminated after ca. 11 hours. Sampling was carried out as described in Example 1, and frozen for further analysis.

Figure 2:
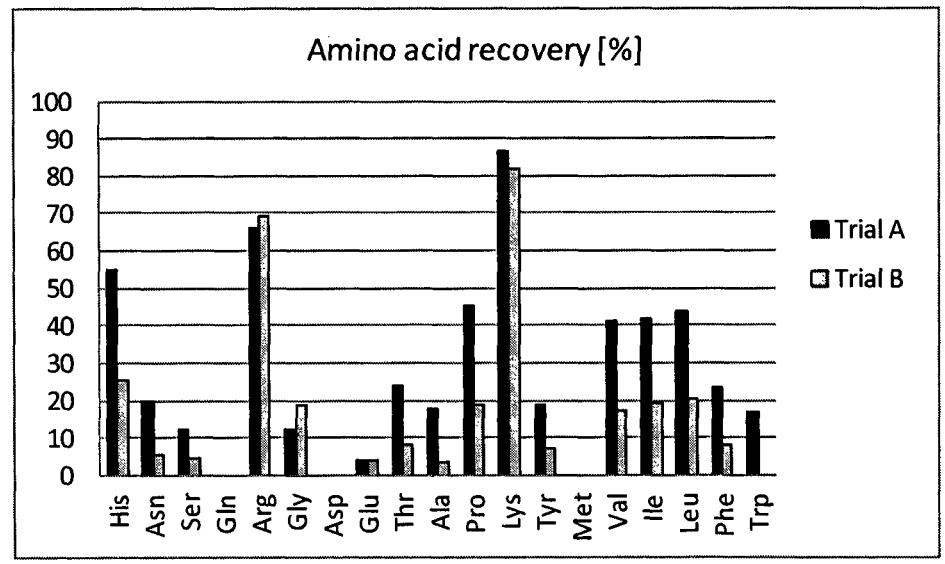
FIG. 2 shows the percentage recoveries, relative to wort, of amino acids after REED assisted enzymatic processes converting glucose to gluconic acid. Both trials were carried out at 40° C. and terminated after ca. 11 hours. For trial A, pH set-point was 4.2. For trial B, pH set-point was 5.5.

Glucose wort and end-products from Trial A and Trial B were analysed for free amino acids by a standard HPLC method. The analyses showed that the contents of amino acids decreased considerably during each of the two trials. FIG. 2 shows the recoveries of amino acids in the two final products, relative to glucose wort. Interestingly, the level of amino acids was even lower in the sample treated at pH 4.2 compared to pH 5.5, demonstrating that a pH close to or higher that the pl of the amino acids in question is not required, and perhaps even not advantageous.

The contents of methionine, valine, isoleucine, leucine, and phenylalanine in the final products are of particular interest for flavour stability, since these amino acids are precursors for the staling aldehydes which develop in beverages during storage. Data for the contents in wort and end-products of each of these amino acids, as well as the sum of these, are listed in Table 2.

TABLE 2

Contents of methionine, valine, isoleucine, leucine, and phenylalanine in starting wort and after REED assisted enzymatic conversion of glucose to gluconic acid in Trial A and B. All values are mg/L.

| | Met | Val | Ile | Leu | Phe | Sum of AA |
|---|---|---|---|---|---|---|
| Wort for Trial A + B | 39 | 135 | 85 | 186 | 167 | 612 |
| End Trial A | 0 | 55 | 35 | 81 | 39 | 210 |
| End Trial B | 0 | 23 | 16 | 37 | 14 | 90 |

It is expected that the level of amino acids could have been reduced further by running the REED treatment for a longer time.

The final products were bottled and stored at room temperature for 13 months. The stored beverages during Trial B were tasted by a panel of 5 trained beer tasters, and the taste was deemed "not aged".

Example 2

The equipment described in Example 1, Experimental lab-REED setup, was used for fermentation of glucose wort with lactic acid bacteria. The bioreactor was filled with 5 L of glucose wort prepared as described in Example 1, heated to 37° C., and inoculated with 20 g of a commercial *Lactococcus lactis* culture (Chr. Hansen, DK, strain R-607). A gradual drop in pH was observed, due to microbial conversion of glucose to lactic acid. At time=1.25 hours after inoculation, automatic titration with 46% KOH to a set-point of 5.5 was started. After 4 hours, the conductivity had increased to ca. 5.0 mS/cm and the AX-REED treatment was started by starting all pumps and adding 200 ml 46% KOH to 8 L DI water in the AX-Dialysate tank, after which pH control at pH 5.5 was taken over by the REED control module. 3 L of DI water was used as CX-Dialysate. The REED control module was adjusting current density through the AX-REED in response to changes in pH. In this way the rate of exchange of lactate for $OH^-$ was regulated, hereby controlling the pH. After 22.67 hours, when the conductivity was slightly above 10 mS/cm, desalting was started by starting CX-REED treatment by adding 200 ml $H_3PO_4$ to the CX-Dialysate and applying a fixed electrical current through the CX-stack. After 24.75 hours, the acidification step was started by cutting the electrical current to the AX-REED and replacing the AX-Dialysate with DI water. The trial was terminated after ca. 25.5 hours, when pH was decreased to 4.35 and the conductivity was 1.7 mS/cm.

Throughout this trial (C), aliquots were taken for analyses. All samples were centrifuged at 4000 rpm for 10 minutes and then pasteurized at 64° C. for 30 minutes. Plato of the sample was measured, and the remains were finally frozen until further analysis.

Figure 3:
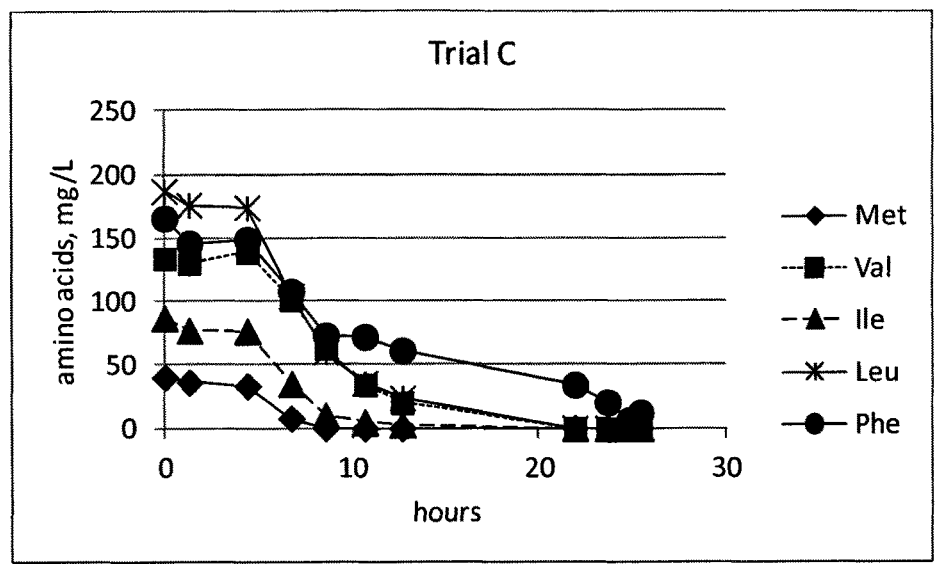
FIG. 3 shows the reduction in the contents of methionine (Met), valine (Val), isoleucine (Ile), leucine (Leu), and phenylalanine (Phe) in wort during REED assisted fermentation of glucose to lactic acid using Lc. Lactis. The fermentation was carried out at 37° C. and pH 5.5.

The samples were analysed for free amino acids by a standard HPLC method. The analyses showed that the contents of amino acids decreased to very low levels during the trial. FIG. 3 shows the reduction in the contents of methionine, valine, isoleucine, leucine, and phenylalanine in wort during REED assisted fermentation of glucose to lactic acid using *Lc. lactis*. These amino acids are precursors for the staling aldehydes which develop in beverages during storage. It is evident that the contents of the five amino acids start to decline at the on-set of the REED-process, and that no or only very small amounts are left at the end of the trial.

Pilot-scale REED fermentations were also carried out, essentially as described for the lab-scale fermentations.

In one trial (PT 58) a REED pilot system (Model 2011.01, Jurag Separation, DK) equipped with a 12 cell pair AX-REED stack and a 10 cell pair CX-REED stack (same membrane types as used in Example 1) was connected to a 50 L fermenter. The fermenter was filled with 50 L glucose wort, attemperated to 30° C. and inoculated with 200 g *Lactococcus lactis* at time=0. The glucose wort had at start a pH of 5.2 and a conductivity of ca. 2.5 mS/cm. Titration with 46% KOH to a pH set-point at 5.5 was started at time=0.83 hours. At time=3.75 hours, the conductivity was ca. 5.0 mS/cm$^2$. Base titration was then stopped, and the REED system took over pH control. At time=43.75 hours, the desalting step was started. At time=44.25 hours, the acidification step was started. The REED fermentation was stopped at time=45 hours.

In another trial (PT 69), the REED pilot system was equipped with a 40 cell pair AX-REED stack and a 10 cell pair CX-REED stack (same membrane types as used in Example 1) and connected to a 200 L fermenter. The fermenter was filled with 150 L glucose wort, attemperated to 30° C. and inoculated with 500 g *Lactococcus lactis* at time=0. The glucose wort had at start a pH of 5.2 and a conductivity of ca. 2.5 mS/cm.

Figure 4:
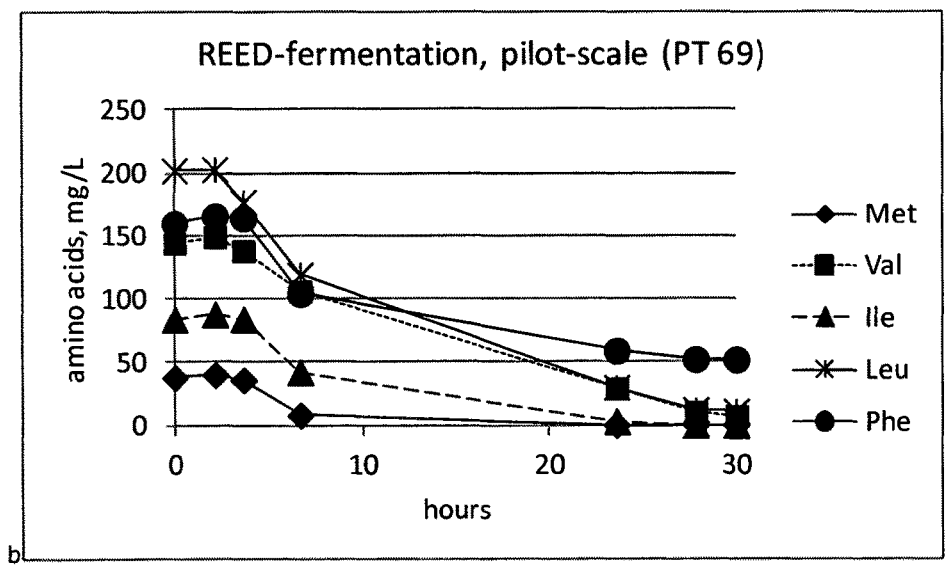
FIG. 4 shows reduction in the contents of methionine (Met), valine (Val), isoleucine (Ile), leucine (Leu), and phenylalanine (Phe) in wort during REED assisted fermentation of glucose to lactic acid using Lc. Lactis. The fermentation was carried out in 150 L scale at 30° C. and pH 5.5

Titration with 46% KOH to a pH set-point at 5.5 was then started. At time=3.25 hours, the conductivity was ca. 5.0 mS/cm. Base titration was then stopped, and the REED system took over pH control. At time=27.15 hours, the desalting step was started. At time=29.25 hours, the acidification step was started. The REED fermentation was stopped at time=30.00 hours. FIG. 4 shows the reduction in the contents of methionine, valine, isoleucine, leucine, and phenylalanine in wort during trial PT 69.

It is evident from Trial 69 described above, that the contents of methionine, valine, isoleucine, leucine, and phenylalanine are hardly reduced at all during the initial phase, where pH 5.5 is maintained by titration with base and not by the REED system, even though a reduction in the contents of some other amino acids can be observed (probably as a result of consumption by *Lactococcus lactis*). However, the contents of methionine, valine, isoleucine, leucine, and phenylalanine start declining when the REED-process is started. Depending on processing time, these amino acids can be practically completely removed, see Table 3.

TABLE 3

Contents in mg/L of methionine, valine, isoleucine, leucine, and phenylalanine in the starting wort and after REED-fermentation with *Lc. Lactis*.

| | Met | Val | Ile | Leu | Phe | Sum of AA |
|---|---|---|---|---|---|---|
| Starting wort PT69 | 38 | 144 | 84 | 202 | 160 | 628 |
| Starting wort PT58 | 41 | 141 | 89 | 196 | 162 | 629 |
| End PT69 | 0 | 7 | 0 | 11 | 52 | 70 |
| End PT58 | 0 | 0 | 0 | 0 | 3 | 3 |

Example 3

Figure 5:
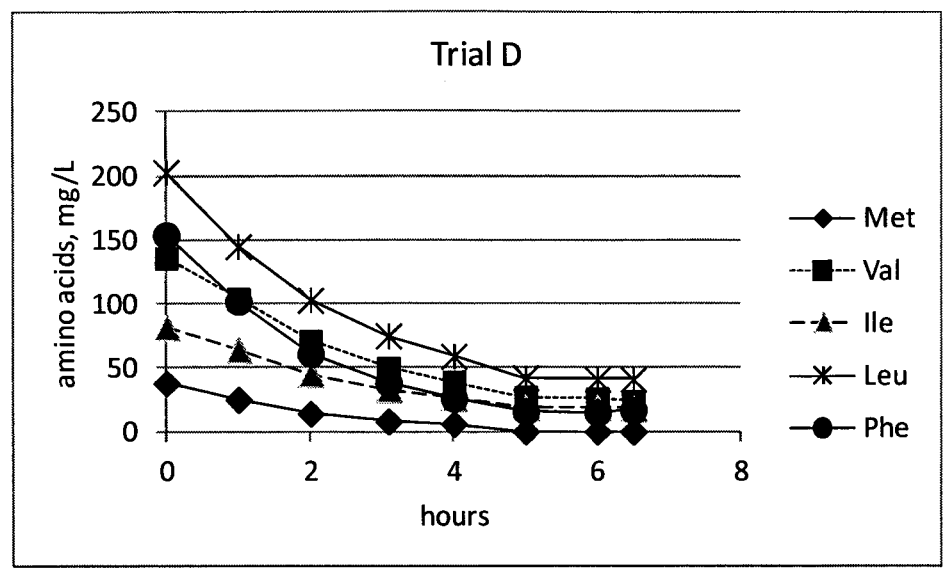
FIG. 5 shows reduction in the contents of methionine (Met), valine (Val), isoleucine (Ile), leucine (Leu), and phenylalanine (Phe) in wort during titration of lactic acid and pH control using REED. 5 L scale at 40° C. and pH 5.5.

The equipment described in Example 1, Experimental lab-REED setup, was used for controlling pH during titration of glucose wort with lactic acid in this trial (Trial D). The bioreactor was filled with 5 L of glucose wort prepared as described in Example 1, heated to 40° C., and titration with 80% food grade lactic acid (Galactid Excel 80, from Galactic) directly into the fermenter, was started at t=0 hours. pH was controlled at 5.5 through the Biostat control system by addition of 46% KOH. When the conductivity had increased from ca. 2 mS/cm to ca. 5 mS/cm, at t=0.34 hours, control of pH was taken over by the REED Control Module and AX-REED was initialised. 8 L of 1.0 M KOH was used as AX-Dialysate and 3 L DI water was used as CX-Dialysate. At t=4.34 hours, desalting was started by starting CX-REED by adding 400 ml 75% $H_3PO_4$ to the CX dialysate and at t=6 hours acidification was started by replacing the AX dialysate with 3 L DI water and stopping lactic acid titration as well as the electrical current on the AX REED. All in all 600 g of 80% lactic acid was titrated into the bioreactor. The trial was stopped at t=6.75 hours when pH had reached 4.3. FIG. 5 shows the reduction in the contents of methionine, valine, isoleucine, leucine, and phenylalanine in wort during Trial D. Table 4 shows the absolute values for the untreated glucose wort and at the end of Trial D.

TABLE 4

Contents of methionine, valine, isoleucine, leucine, and phenylalanine in starting wort and after titration with lactic acid using REED for pH control.

| | Met | Val | Ile | Leu | Phe | Sum of AA |
|---|---|---|---|---|---|---|
| Start wort | 38 | 136 | 82 | 203 | 154 | 613 |
| End Trial D | 0 | 24 | 18 | 41 | 17 | 100 |

Example 4

Various doses of hydrogen peroxide ($H_2O_2$) were added to 200-mL aliquots of glucose wort, pH 5.2, prepared essentially as described in Example 1. The samples were then incubated at 40° C. The concentration of $H_2O_2$ at start of the experiment was approx. 50 ppm, 250 ppm, 1000 ppm, and 2500 ppm, estimated by Merckoquant peroxide test strips (Merck). As control, glucose wort without added $H_2O_2$ was also incubated. 5-mL samples were taken after incubation for 2.25, 6.5, and 27 hours. The content of $H_2O_2$ was estimated, using peroxide test strips. The samples were then incubated for 10 min. at 40° C. with 10 uL of a catalase suspension (C30-500MG from Sigma) in order to convert $H_2O_2$ to water and oxygen. After this treatment, $H_2O_2$ could no longer be detected, and the samples were stored frozen until analysis for free amino acids, using a standard HPLC procedure. Untreated wort was also analysed for free amino acids and $H_2O_2$.

Recoveries for valine, isoleucine, leucine, and phenylalanine were 80-105%, even after 27 hours in the presence of the highest tested concentration of $H_2O_2$, and there was no correlation between recovery and $H_2O_2$ concentration. Thus, $H_2O_2$ has no effect on these four amino acids at the tested concentrations.

Methionine recovery after 2.25, 6.5, and 27 hours was 103%, 100%, and 80% in the control sample, but only 73%, 42%, and 10% in the sample dosed with 50 ppm $H_2O_2$ at start, and 5%, 0%, and 0% in the samples dosed with 250 ppm $H_2O_2$ at start. Thus, even low doses of $H_2O_2$ destroy methionine. In all samples taken during incubation with higher doses of $H_2O_2$, no methionine could be detected.

Interestingly, no increase in methional content could be detected after incubation with $H_2O_2$. Thus it appears that the methionine is not transformed into the Strecker aldehyde methional.

Figure 6:
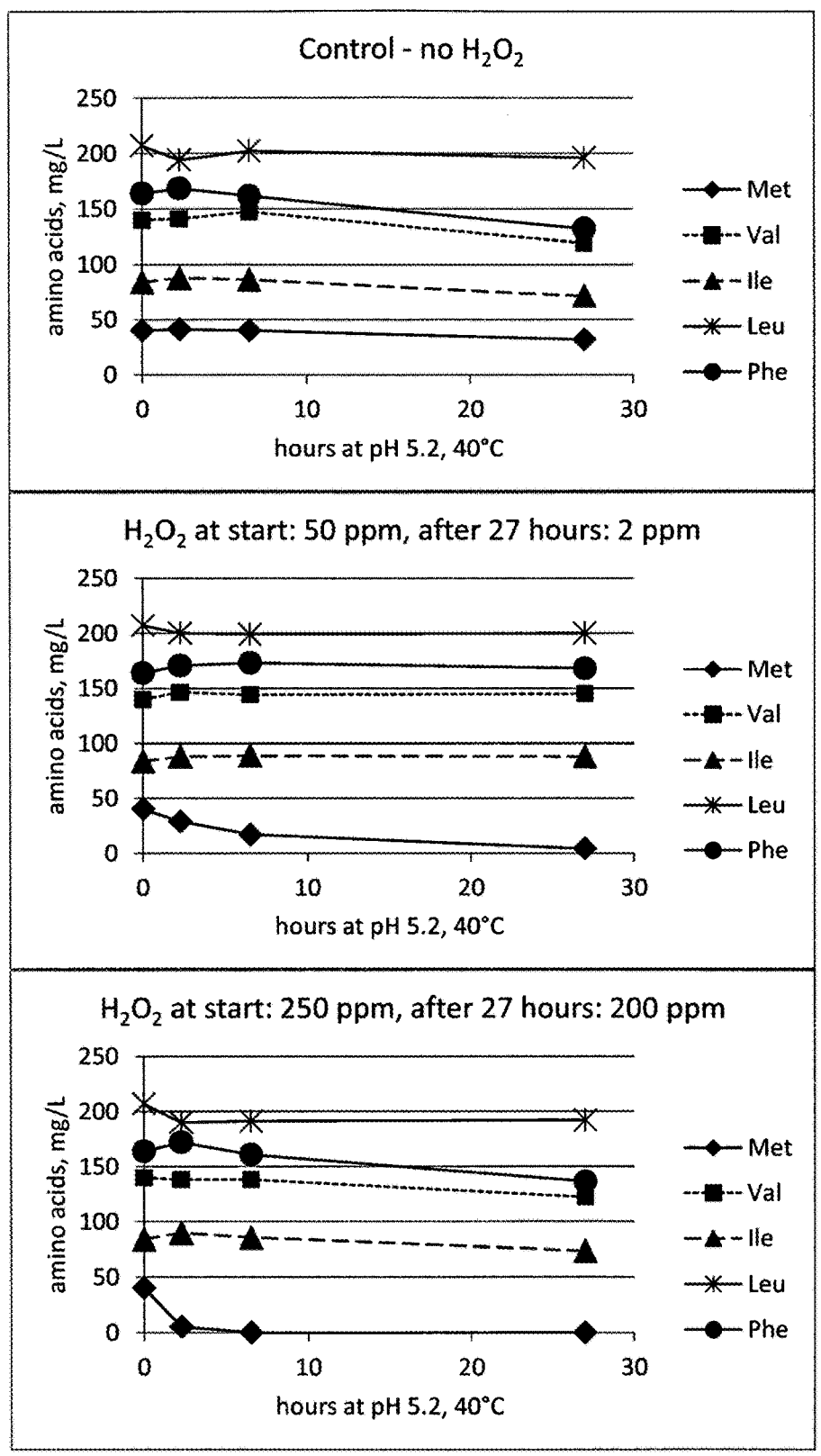
FIG. 6 shows the contents of the amino acids methionine (Met), valine (Val), isoleucine (Ile), leucine (Leu), and phenylalanine (Phe) in glucose wort during incubation with hydrogen peroxide at 40° C.
Upper panel: Control—wort incubated without addition of $H_2O_2$.
Middle panel: $H_2O_2$ at start 50 ppm.
Lower panel: $H_2O_2$ at start 250 ppm.

FIG. 6 shows the contents of the amino acids methionine, valine, isoleucine, leucine, and phenylalanine in those samples where $H_2O_2$ was, at start, either 0, 50, or 250 ppm.

Results for hydrogen peroxide are listed in table 5. Consumption of $H_2O_2$ during 27 hours at 40° C. was ca. 50 ppm.

TABLE 5

Content of hydrogen peroxide after incubation at 40° C.

|  | ppm $H_2O_2$ at start | | | | |
| --- | --- | --- | --- | --- | --- |
|  | 0 | 50 | 250 | 1000 | 2500 |
| ppm $H_2O_2$ after 2.25 hours | 0 | 30 | 225 | 1000 | 2500 |
| ppm $H_2O_2$ after 27 hours | 0 | 2 | 200 | 1000 | 2500 |

Example 5

For production of a beverage, two REED fermentations of glucose wort with *Lactococcus lactis* were carried out in pilot-scale (each 50 L) essentially as described in Example 2. One of the REED-fermentations was stopped after ca. 27 hours, the other after ca. 48 hours. After fermentation, the products were filtered to remove lactic acid bacteria. The filtered liquids were blended to obtain a pleasant sweetness and flavoured by dry-hopping with a mixture of five different hop varieties. The total dose of hop pellets was 2 g/L, and the pellets were left in the blend for 24 hours at 2° C. After dry-hopping, the liquid was filtered, and a small volume (ca. 5%) of an aromatic beer (Pale Ale style) was added. The liquid was then carbonized, bottled, and pasteurized. The finished beverage was called REED-beverage DS.

The contents of free amino acids in the finished beverage were determined by a standard HPLC-method.

Data for methionine, valine, isoleucine, leucine, and phenylalanine are listed in Table 6 These amino acids are precursors for staling aldehydes. It is evident that the REED-beverage contains much lower amounts of these amino acids than regular all-malt beer of ca. 5.0% alcohol by volume (ABV) and in particular of methionine.

TABLE 6

Contents in mg/L of methionine, valine, isoleucine, leucine, and phenylalanine in REED-beverage DS. For comparison, data for typical levels in regular all-malt beer are included.

|  | Met | Val | Ile | Leu | Phe | Sum of AA |
| --- | --- | --- | --- | --- | --- | --- |
| REED-beverage DS | 0 | 25 | 4 | 26 | 36 | 91 |

REED-beverage DS was stored at 20° C. After storage for 2 months and 6 months, the beverage was tasted by trained beer tasters. The panels were asked to assign scores, on a scale of 0 to 5, for the aging flavours papery, oxidized, aged, bready, caramel, and burnt, and finally to assign a total aging score. It is desirable to obtain low scores for all these flavours. In particular it is desirable that these scores do not increase significantly during storage. Descriptors for the scoring system are listed in Table 7.

TABLE 7

Descriptors for flavour scores on a scale from 0 to 5.

| Score | Flavour | Total aging score |
| --- | --- | --- |
| 0 | Absent | Not aged |
| 1 | Just detectable | Just detectably aged |
| 2 | Slight | Slightly aged |
| 3 | Easily noticeable | Easily noticeable aged |
| 4 | Markedly | Markedly aged |
| 5 | Strong | Strongly aged |

Figure 7:
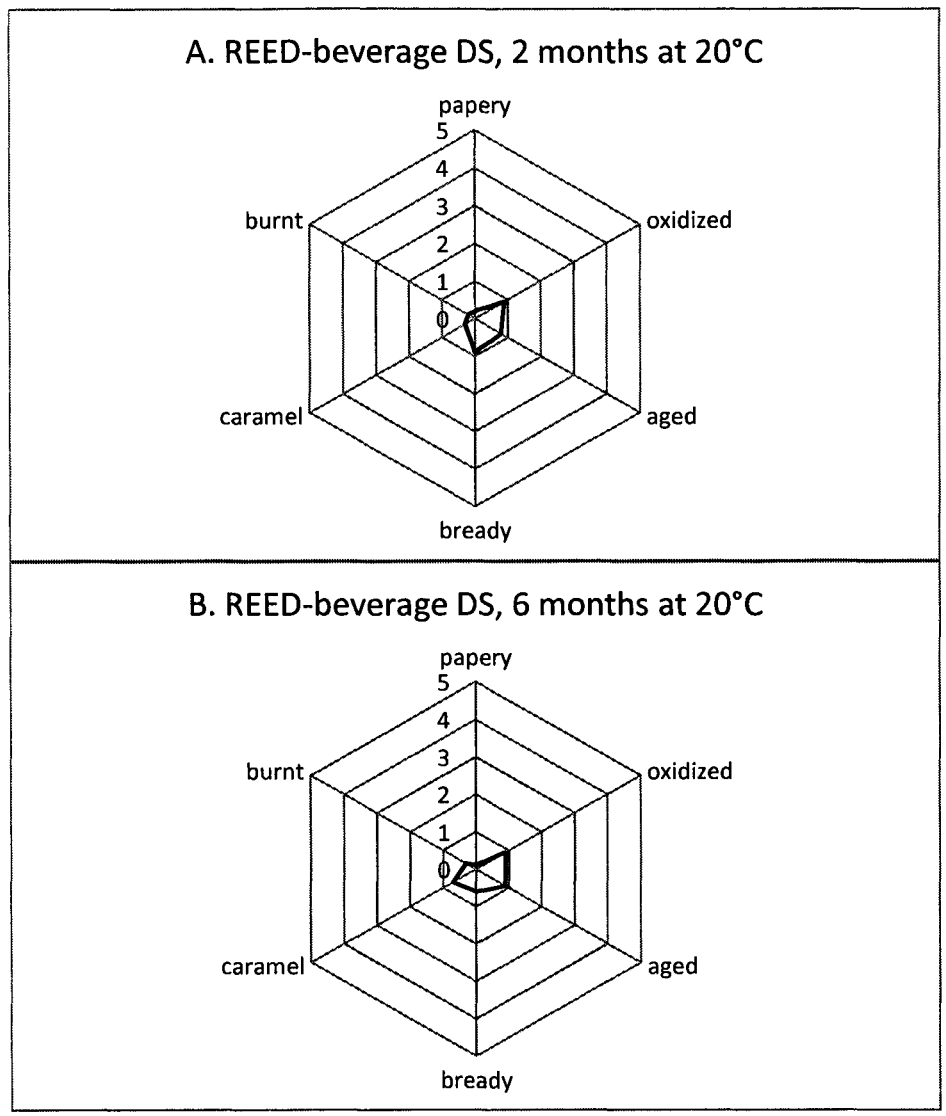
FIG. 7 shows scores for individual aging flavours, on a scale of 0 to 5, for REED-beverage DS.
A: Beverage DS, stored 2 months at 20° C.
B: Beverage DS, stored 6 months at 20° C.

The total aging score for REED-beverage DS was very low in both sessions, as listed in table 8. For comparison, typical scores for regular all-malt beer, ca. 5.0% ABV, are included in the table. Scores for individual aging flavours are shown in FIG. 7. The beverage got very low scores for all aging flavours, and there was no significant difference between scores obtained after 2 months and 6 months. Thus, individual aging flavours were not more prominent after 6 months than after 2 months.

TABLE 8

Total aging scores, on a scale of 0 to 5, for REED-beverage DS, and typical values for regular all-malt beer, 4.6-5.0% ABV.

| Storage | Total aging score, REED-beverage DS | Total aging score, typical values for all-malt beer |
| --- | --- | --- |
| 2 months at 20° C. | 1.3 | 2.0 +/− 0.4 |
| 6 months at 20° C. | 1.6 | 2.8 +/− 0.4 |

Example 6

In another trial (PT 87) a REED pilot system (Model 2011.01, Jurag Separation, DK) equipped with a 40 cell pair AX-REED stack (same membrane types as used in Example 1) and a 3 cell pair CX-REED stack (same membrane types as used in Example 1) was connected to a 50 L fermenter. The fermenter was filled with 10 kg maltose wort, 17.6 kg glucose wort, and 22.4 kg water to obtain a final Plato of 8%. Maltose wort was conventional wort. Glucose wort was produced essentially as described in Example 1. The fermenter was heated to 37° C. and inoculated with 200 g *Lactococcus lactis* at time=0. The glucose wort had at start a pH of 5.2 and a conductivity of ca. 1.5 mS/cm. Titration with 11.5% KOH to a pH set-point of 6.0 was started at time=0 hours. At time=1.5 hours, the conductivity was ca. 5.0 mS/cm. Base titration was then stopped, and the AX-REED system took over pH control. At time=11 hours, the desalting step was started (using the AX-REED and the CX-REED simultaneously). At time=13 hours, the acidification step was started (CX-REED only). The REED fermentation was stopped at time=13.5 hours.

Figure 9:
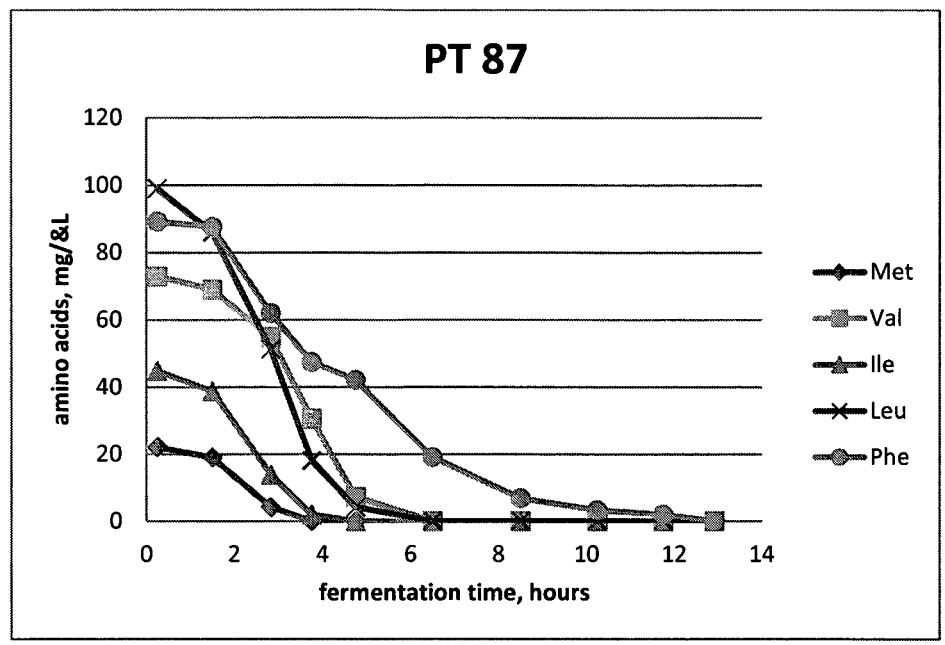
FIG. 9 shows reduction in the contents of methionine (Met), valine (Val), isoleucine (Ile), leucine (Leu), and phenylalanine (Phe) in wort during REED assisted fermentation with L. Lactis. The fermentation was carried out at 37° C. and pH 6.0. All the Strecker aldehyde forming amino acids are removed after 13 h of fermentation.

FIG. 9 shows the decrease in amino acid concentration during fermentation. All the Strecker aldehyde forming amino acids are removed after 13 h of fermentation.

The fermentation broth was filtered to remove cells, carbonized and bottled and stored at 3 different conditions: 2° C., 20° C. or 37° C. The beverage was tasted and scored by a trained panel as described in Example 5. The beverage got very low scores for all aging flavours, and there was no significant difference between Total Aging Score obtained after 2 weeks at 2° C. (score: 1.4), 2 weeks at 37° C. (score: 1.6), or 3 month at 20° C. (score: 1.6). Descriptors for the scoring system are listed in Table 7.

Example 7

In yet another trial (PT 97), the REED pilot system described in Example 6 was connected to a 50 L fermenter. The fermenter was filled with 50 kg glucose wort of Plato 14.3%, prepared essentially as described in Example 1. The fermenter was heated to 30° C. and inoculated with 20 g *Lactococcus lactis* at time=0. The glucose wort had at start a pH of 5.2 and a conductivity of ca. 2.5 mS/cm. Titration with 11.5% KOH to a pH set-point of 5.5 was started at time=0 hours. At time=4.2 hours, the conductivity was ca. 5.5 mS/cm. Base titration was then stopped, and the AX-REED system took over pH control. At time=24 hours, two 5-L samples (Sample A and Sample B) were taken from the fermenter, and the desalting step was then started by starting the CX-REED. At time=26.5 hours, the acidification step was started by turning off the AX-REED. The REED fermentation was stopped at time=28 hours, when pH had decreased to 4.35, and a third 5-L sample (Sample C) was taken from the fermenter.

Immediately after sampling, sample A was transferred to a 30° C. room and stirred gently. A gradual drop in pH was observed due to production of lactic acid by the lactic acid bacteria in the sample. When pH had decreased to 4.35, sample A was centrifuged and sterile filtered to remove the lactic acid bacteria. The sample was finally bottled and pasteurized for 30 minutes at 64° C.

Immediately after sampling, sample B was centrifuged and sterile filtered to remove lactic acid bacteria. The sample was then transferred a 5 L bioreactor vessel integrated in the Biostat B fermentation system described in Example 1. Oxygen was supplied to the bioreactor from a pressurized tank (52% oxygen) and dispersed in the liquid by stirring to keep an oxygen saturation of 30%. An 0.5-ml aliquot of an enzyme preparation containing both glucose oxidase activity and catalase activity was added to the liquid. After adding the enzyme preparation, a gradual drop in pH was observed due to conversion of glucose to gluconic acid and hydrogen peroxide. When pH reached 4.35, the oxygen supply was terminated. Sample B was then heated to 80° C. and kept at this temperature for 30 minutes in order to inactivate the enzyme activities. The sample was finally bottled and pasteurized.

Immediately after sampling, sample C was centrifuged and sterile filtered to remove lactic acid bacteria. A 1-L aliquot was then taken apart, and 1 mL of a 30% $H_2O_2$ was added to this sample (Sample D). Sample D was left at ca. 22° C. for three days, then bottled and pasteurized. The remaining part of sample C received no further treatment, except for bottling and pasteurization.

The contents of free amino acids in the four samples were determined by a standard HPLC method. Table 9 shows the contents of methionine, valine, isoleucine, leucine, and phenylalanine. These amino acids are precursors for the staling aldehydes which develop by Strecker degradation during storage.

TABLE 9

Contents, in mg/L, of methionine, valine, isoleucine, leucine, and phenylalanine in Samples A, B, C and D.

| | free amino acids, mg/L | | | | |
|---|---|---|---|---|---|
| sample | Met | Val | Ile | Leu | Phe |
| A | 4 | 44 | 6 | 42 | 99 |
| B | 0 | 48 | 7 | 48 | 99 |
| C | 4 | 42 | 5 | 38 | 95 |
| D | 0 | 43 | 5 | 40 | 101 |

It is expected that the level of amino acids could have been reduced further by running the REED treatment for a longer time.

One bottle of each sample are stored at 37° C. for two weeks, while remaining bottles are stored at 5° C. Aroma and taste of the samples stored warm are then evaluated by a panel of trained beer tasters, and the level of Strecke aldehydes is determined.

The invention claimed is:

1. A method for producing a flavor stable cereal based beverage, said method comprising the steps of:
   i) providing a cereal extract comprising at least 25 mg/L methionine;
   ii) treating said cereal extract to reduce the content of one or more of methionine, phenylalanine, valine, leucine and isoleucine, thereby obtaining a treated cereal extract, wherein the content of the one or more of methionine, phenylalanine, valine, leucine and isoleucine in said cereal extract is reduced by the steps of:
      a) increasing the level of an acid and/or a base in the cereal extract; and
      b) removing at least part of the acidic anion of said increased acid and/or of the basic cation of said increased base through a Reverse Electro-Enhanced Dialysis (REED) membrane stack; and
   iii) processing said treated cereal extract into a beverage, wherein said beverage has a total content of methionine, phenylalanine, valine, leucine and isoleucine of at the most 100 mg/L and/or a content of methionine less than 5 mg/L.

2. The method according to claim 1, said method comprising the steps of:
   i) providing a cereal extract comprising at least 25 mg/L methionine,
   ii) inserting cereal extract into a tank connected to an AX-REED membrane stack and a CX-REED membrane stack;
   iii) increasing the level of an acid in the cereal extract using a microorganism capable of fermenting a sugar to form an organic acid;

iv) removing at least part of the acidic anion of said increased acid in the cereal extract by AX-REED treatment; and
v) acidifying said liquid
thereby obtaining a treated cereal extract; and
optionally further processing said treated cereal extract into a beverage.

3. The method according to claim 2, wherein acidification is performed by treatment with an enzyme or mixture of enzymes capable of catalyzing formation of an acid.

4. The method according to claim 2, wherein the method further comprises a step of treating the cereal extract with an oxidizing agent.

5. The method according to claim 1, wherein the cereal extract is wort, malted based wort or glucose wort.

6. The method according to claim 1, wherein step iii) comprises fermentation of the treated cereal extract with a microorganism.

7. The method according to claim 1, wherein step iii) comprises
   a) adding one or more additional compound(s) to the treated cereal extract and/or
   b) mixing the treated cereal extract with another liquid and/or
   c) a step of fermentation with a microorganism.

8. The method according to claim 1, wherein the method further comprises the step of storing said beverage for at least 1 week.

9. The method according to claim 1, wherein the pH is maintained in the range of 4 to 7 throughout the REED treatment.

10. The method according to claim 1, wherein the method comprises increasing the level of an acid in the cereal extract using a microorganism capable of fermenting a sugar to form an organic acid.

11. The method according to claim 1, wherein the method comprises the steps of:
   I. inserting cereal extract into a tank connected to an AX-REED membrane stack and a CX-REED membrane stack;
   II. increasing the level of an acid in the cereal extract;
   III. removing at least part of the acidic anion of said increased acid in the cereal extract by AX-REED treatment;
   IV. removing cations in the cereal extract by CX-REED treatment;
   wherein some of steps (I-IV) may be performed simultaneously.

12. A method for reducing the content of at least one amino acid in a cereal extract, said method comprising the steps of:

increasing the level of an acid and/or a base in the cereal extract; and
removing at least part of the acidic anion of said increased acid and/or of the basic cation of said increased base through a Reverse Electro-Enhanced Dialysis (REED) membrane stack.

13. The method according to claim 12, wherein the method comprises increasing the level of an acid in the cereal extract using an enzyme or mixture of enzymes capable of catalyzing formation of an acid.

14. The method according to claim 13, wherein the enzyme is glucose oxidase.

15. The method according to claim 12, wherein the method comprises increasing the level of an acid in the cereal extract using a microorganism capable of fermenting a sugar to form an organic acid.

16. The method according to claim 15, wherein the microorganism is a *gluconobacter*.

17. The method according to claim 12, wherein the method comprises the steps of
   I. inserting cereal extract into a tank connected to an AX-REED membrane stack and a CX-REED membrane stack;
   II. increasing the level of an acid in the cereal extract;
   III. removing at least part of the acidic anion of said increased acid in the cereal extract by AX-REED treatment;
   IV. removing cations in the cereal extract by CX-REED treatment;
   wherein some of steps (I-IV) may be performed simultaneously.

18. The method according to claim 12, wherein said REED treatment is performed for an amount of time sufficient to result in a total content of methionine, phenylalanine, valine, leucine and isoleucine of at the most 100 mg/L in the treated cereal extract.

19. The method according to claim 12, wherein the pH is maintained in the range of 4 to 7 throughout the REED treatment.

20. A method for reducing the content of methionine in a cereal extract, said method comprising the step of
   i. incubating said cereal extract with 20 to 2500 ppm $H_2O_2$; or
   ii. incubating said cereal extract with an enzyme or a mixture of enzymes capable of catalyzing formation of $H_2O_2$.

21. The method according to claim 20, wherein said incubation results in a treated cereal extract containing at the most 15 mg/L methionine.

22. The method according to claim 20, wherein said enzyme or mixture of enzymes comprises a glucose oxidase.

* * * * *

UNITED STATES PATENT AND TRADEMARK OFFICE
CERTIFICATE OF CORRECTION

PATENT NO. : 10,301,582 B2
APPLICATION NO. : 15/108216
DATED : May 28, 2019
INVENTOR(S) : Gojkovic et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 126 days.

Signed and Sealed this
Nineteenth Day of May, 2020

Andrei Iancu
*Director of the United States Patent and Trademark Office*

SEQUENCE LISTING

<160> NUMBER OF SEQ ID NOS: 2

<210> SEQ ID NO 1
<211> LENGTH: 605
<212> TYPE: PRT
<213> ORGANISM: Aspergillus niger

<400> SEQUENCE: 1

Met Gln Thr Leu Leu Val Ser Ser Leu Val Val Ser Leu Ala Ala Ala
1               5                   10                  15

Leu Pro His Tyr Ile Arg Ser Asn Gly Ile Glu Ala Ser Leu Leu Thr
            20                  25                  30

Asp Pro Lys Asp Val Ser Gly Arg Thr Val Asp Tyr Ile Ile Ala Gly
        35                  40                  45

Gly Gly Leu Thr Gly Leu Thr Thr Ala Ala Arg Leu Thr Glu Asn Pro
    50                  55                  60

Asn Ile Ser Val Leu Val Ile Glu Ser Gly Ser Tyr Glu Ser Asp Arg
65                  70                  75                  80

Gly Pro Ile Ile Glu Asp Leu Asn Ala Tyr Gly Asp Ile Phe Gly Ser
                85                  90                  95

```
Ser Val Asp His Ala Tyr Glu Thr Val Glu Leu Ala Thr Asn Asn Gln
            100                 105                 110

Thr Ala Leu Ile Arg Ser Gly Asn Gly Leu Gly Gly Ser Thr Leu Val
        115                 120                 125

Asn Gly Gly Thr Trp Thr Arg Pro His Lys Ala Gln Val Asp Ser Trp
130                 135                 140

Glu Thr Val Phe Gly Asn Glu Gly Trp Asn Trp Asp Asn Val Ala Ala
145                 150                 155                 160

Tyr Ser Leu Gln Ala Glu Arg Ala Arg Ala Pro Asn Ala Lys Gln Ile
                165                 170                 175

Ala Ala Gly His Tyr Phe Asn Ala Ser Cys His Gly Val Asn Gly Thr
            180                 185                 190

Val His Ala Gly Pro Arg Asp Thr Gly Asp Asp Tyr Ser Pro Ile Val
        195                 200                 205

Lys Ala Leu Met Ser Ala Val Glu Asp Arg Gly Val Pro Thr Lys Lys
        210                 215                 220

Asp Phe Gly Cys Gly Asp Pro His Gly Val Ser Met Phe Pro Asn Thr
225                 230                 235                 240

Leu His Glu Asp Gln Val Arg Ser Asp Ala Ala Arg Glu Trp Leu Leu
                245                 250                 255

Pro Asn Tyr Gln Arg Pro Asn Leu Gln Val Leu Thr Gly Gln Tyr Val
            260                 265                 270

Gly Lys Val Leu Leu Ser Gln Asn Gly Thr Thr Pro Arg Ala Val Gly
        275                 280                 285

Val Glu Phe Gly Thr His Lys Gly Asn Thr His Asn Val Tyr Ala Lys
        290                 295                 300

His Glu Val Leu Leu Ala Ala Gly Ser Ala Val Ser Pro Thr Ile Leu
305                 310                 315                 320

Glu Tyr Ser Gly Ile Gly Met Lys Ser Ile Leu Glu Pro Leu Gly Ile
                325                 330                 335

Asp Thr Val Val Asp Leu Pro Val Gly Leu Asn Leu Gln Asp Gln Thr
            340                 345                 350

Thr Ala Thr Val Arg Ser Arg Ile Thr Ser Ala Gly Ala Gly Gln Gly
        355                 360                 365

Gln Ala Ala Trp Phe Ala Thr Phe Asn Glu Thr Phe Gly Asp Tyr Ser
370                 375                 380

Glu Lys Ala His Glu Leu Leu Asn Thr Lys Leu Glu Gln Trp Ala Glu
385                 390                 395                 400

Glu Ala Val Ala Arg Gly Gly Phe His Asn Thr Thr Ala Leu Leu Ile
                405                 410                 415

Gln Tyr Glu Asn Tyr Arg Asp Trp Ile Val Asn His Asn Val Ala Tyr
            420                 425                 430

Ser Glu Leu Phe Leu Asp Thr Ala Gly Val Ala Ser Phe Asp Val Trp
        435                 440                 445

Asp Leu Leu Pro Phe Thr Arg Gly Tyr Val His Ile Leu Asp Lys Asp
450                 455                 460

Pro Tyr Leu His His Phe Ala Tyr Asp Pro Gln Tyr Phe Leu Asn Glu
465                 470                 475                 480

Leu Asp Leu Leu Gly Gln Ala Ala Thr Gln Leu Ala Arg Asn Ile
                485                 490                 495

Ser Asn Ser Gly Ala Met Gln Thr Tyr Phe Ala Gly Glu Thr Ile Pro
        500                 505                 510
```

```
Gly Asp Asn Leu Ala Tyr Asp Ala Asp Leu Ser Ala Trp Thr Glu Tyr
            515                 520                 525

Ile Pro Tyr His Phe Arg Pro Asn Tyr His Gly Val Gly Thr Cys Ser
        530                 535                 540

Met Met Pro Lys Glu Met Gly Val Val Asp Asn Ala Ala Arg Val
545                 550                 555                 560

Tyr Gly Val Gln Gly Leu Arg Val Ile Asp Gly Ser Ile Pro Pro Thr
                565                 570                 575

Gln Met Ser Ser His Val Met Thr Val Phe Tyr Ala Met Ala Leu Lys
                580                 585                 590

Ile Ser Asp Ala Ile Leu Glu Asp Tyr Ala Ser Met Gln
            595                 600                 605

<210> SEQ ID NO 2
<211> LENGTH: 587
<212> TYPE: PRT
<213> ORGANISM: Penicillium amagasakiense

<400> SEQUENCE: 2

Tyr Leu Pro Ala Gln Gln Ile Asp Val Gln Ser Ser Leu Leu Ser Asp
1               5                   10                  15

Pro Ser Lys Val Ala Gly Lys Thr Tyr Asp Tyr Ile Ile Ala Gly Gly
                20                  25                  30

Gly Leu Thr Gly Leu Thr Val Ala Ala Lys Leu Thr Glu Asn Pro Lys
            35                  40                  45

Ile Lys Val Leu Val Ile Glu Lys Gly Phe Tyr Glu Ser Asn Asp Gly
        50                  55                  60

Ala Ile Ile Glu Asp Pro Asn Ala Tyr Gly Gln Ile Phe Gly Thr Thr
65                  70                  75                  80

Val Asp Gln Asn Tyr Leu Thr Val Pro Leu Ile Asn Asn Arg Thr Asn
                85                  90                  95

Asn Ile Lys Ala Gly Lys Gly Leu Gly Gly Ser Thr Leu Ile Asn Gly
            100                 105                 110

Asp Ser Trp Thr Arg Pro Asp Lys Val Gln Ile Asp Ser Trp Glu Lys
        115                 120                 125

Val Phe Gly Met Glu Gly Trp Asn Trp Asp Asn Met Phe Glu Tyr Met
    130                 135                 140

Lys Lys Ala Glu Ala Ala Arg Thr Pro Thr Ala Ala Gln Leu Ala Ala
145                 150                 155                 160

Gly His Ser Phe Asn Ala Thr Cys His Gly Thr Asn Gly Thr Val Gln
                165                 170                 175

Ser Gly Ala Arg Asp Asn Gly Gln Pro Trp Ser Pro Ile Met Lys Ala
            180                 185                 190

Leu Met Asn Thr Val Ser Ala Leu Gly Val Pro Val Gln Gln Asp Phe
        195                 200                 205

Leu Cys Gly His Pro Arg Gly Val Ser Met Ile Met Asn Asn Leu Asp
    210                 215                 220

Glu Asn Gln Val Arg Val Asp Ala Ala Arg Ala Trp Leu Leu Pro Asn
225                 230                 235                 240

Tyr Gln Arg Ser Asn Leu Glu Ile Leu Thr Gly Gln Met Val Gly Lys
                245                 250                 255

Val Leu Phe Lys Gln Thr Ala Ser Gly Pro Gln Ala Val Gly Val Asn
            260                 265                 270

Phe Gly Thr Asn Lys Ala Val Asn Phe Asp Val Phe Ala Lys His Glu
        275                 280                 285
```

```
Val Leu Leu Ala Ala Gly Ser Ala Ile Ser Pro Leu Ile Leu Glu Tyr
    290                 295                 300
Ser Gly Ile Gly Leu Lys Ser Val Leu Asp Gln Ala Asn Val Thr Gln
305                 310                 315                 320
Leu Leu Asp Leu Pro Val Gly Ile Asn Met Gln Asp Gln Thr Thr Thr
                325                 330                 335
Thr Val Ser Ser Arg Ala Ser Ser Ala Gly Ala Gly Gln Gly Gln Ala
                340                 345                 350
Val Phe Phe Ala Asn Phe Thr Glu Thr Phe Gly Asp Tyr Ala Pro Gln
            355                 360                 365
Ala Arg Asp Leu Leu Asn Thr Lys Leu Asp Gln Trp Ala Glu Glu Thr
370                 375                 380
Val Ala Arg Gly Gly Phe His Asn Val Thr Ala Leu Lys Val Gln Tyr
385                 390                 395                 400
Glu Asn Tyr Arg Asn Trp Leu Leu Asp Glu Asp Val Ala Phe Ala Glu
                405                 410                 415
Leu Phe Met Asp Thr Glu Gly Lys Ile Asn Phe Asp Leu Trp Asp Leu
                420                 425                 430
Ile Pro Phe Thr Arg Gly Ser Val His Ile Leu Ser Ser Asp Pro Tyr
                435                 440                 445
Leu Trp Gln Phe Ala Asn Asp Pro Lys Phe Phe Leu Asn Glu Phe Asp
    450                 455                 460
Leu Leu Gly Gln Ala Ala Ala Ser Lys Leu Ala Arg Asp Leu Thr Ser
465                 470                 475                 480
Gln Gly Ala Met Lys Glu Tyr Phe Ala Gly Glu Thr Leu Pro Gly Tyr
                485                 490                 495
Asn Leu Val Gln Asn Ala Thr Leu Ser Gln Trp Ser Asp Tyr Val Leu
                500                 505                 510
Gln Asn Phe Arg Pro Asn Trp His Ala Val Ser Ser Cys Ser Met Met
            515                 520                 525
Ser Arg Glu Leu Gly Gly Val Val Asp Ala Thr Ala Lys Val Tyr Gly
    530                 535                 540
Thr Gln Gly Leu Arg Val Ile Asp Gly Ser Ile Pro Pro Thr Gln Val
545                 550                 555                 560
Ser Ser His Val Met Thr Ile Phe Tyr Gly Met Ala Leu Lys Val Ala
                565                 570                 575
Asp Ala Ile Leu Asp Asp Tyr Ala Lys Ser Ala
                580                 585
```